(12) United States Patent
de Graaff et al.

(10) Patent No.: US 9,011,955 B2
(45) Date of Patent: Apr. 21, 2015

(54) SYSTEM FOR PREPARING COFFEE BEVERAGE

(75) Inventors: Gerbrand Kristiaan de Graaff, Hillegom (NL); Gustaaf Frans Brouwer, Nijkerk (NL); Philippe Jacques van Camp, Utrecht (NL); Ivo van Os, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 467 days.

(21) Appl. No.: 13/049,777

(22) Filed: Mar. 16, 2011

(65) Prior Publication Data

US 2011/0256273 A1    Oct. 20, 2011

Related U.S. Application Data

(63) Continuation of application No. PCT/NL2009/050557, filed on Sep. 17, 2009.

(30) Foreign Application Priority Data

Sep. 17, 2008  (NL) .................................... 2001992
Apr. 6, 2009   (NL) .................................... 2002721

(51) Int. Cl.
   *A47J 31/42*    (2006.01)
   *A47J 42/50*    (2006.01)
   (Continued)

(52) U.S. Cl.
   CPC *A47J 31/42* (2013.01); *A47J 42/50* (2013.01); *G01F 11/24* (2013.01); *G01F 11/46* (2013.01)

(58) Field of Classification Search
   CPC .................................. A47J 31/42; A47J 42/50

USPC ................ 99/286, 285, 323.3; 426/518, 433, 426/594–596; 241/24.26, 34, 101.2
See application file for complete search history.

(56) References Cited

U.S. PATENT DOCUMENTS

| 6,339,985 | B1 * | 1/2002 | Whitney ......................... 99/286 |
| 6,349,889 | B1 * | 2/2002 | Sandolo ......................... 241/34 |
| 8,783,164 | B2 * | 7/2014 | Tanja et al. ..................... 99/286 |

(Continued)

FOREIGN PATENT DOCUMENTS

CN    101128142    2/2008
EP    0 380 450 A2  8/1990

(Continued)

OTHER PUBLICATIONS

Berger et al., A Brief History of Packaging (Dec. 2002).*

(Continued)

*Primary Examiner* — Drew Becker
(74) *Attorney, Agent, or Firm* — Foley & Lardner LLP

(57) ABSTRACT

A system for preparing a coffee beverage, provided with a coffee making apparatus comprising a grinder for grinding coffee beans to obtain ground coffee, a coffee beverage preparation device arranged for, with supply of water to the ground coffee, preparing the coffee beverage, and a coffee outlet for dispensing the coffee beverage, a separate coffee bean package with an inner space which at least before use is filled with the coffee beans, wherein the coffee bean package before use is closed off in itself such that the exposure of the coffee beans to ambient air is prevented, a coffee bean inlet for supply of coffee beans from the coffee bean package to the grinder, and a connecting device for connecting the coffee bean package to the coffee making apparatus.

46 Claims, 16 Drawing Sheets

(51) Int. Cl.
*G01F 11/24* (2006.01)
*G01F 11/46* (2006.01)

(56) References Cited

U.S. PATENT DOCUMENTS

| | | |
|---|---|---|
| 2004/0173626 A1 | 9/2004 | Jeor |
| 2007/0257142 A1* | 11/2007 | Chapman .................. 241/92 |
| 2007/0290003 A1 | 12/2007 | Morin et al. |
| 2007/0295752 A1 | 12/2007 | Morin et al. |
| 2011/0185908 A1* | 8/2011 | Berto ........................ 99/286 |
| 2012/0024160 A1* | 2/2012 | Van Os et al. ............ 99/280 |
| 2012/0091238 A1* | 4/2012 | Os et al. .................... 241/36 |
| 2012/0118165 A1* | 5/2012 | Van Os et al. ............ 99/286 |
| 2012/0240777 A1* | 9/2012 | Righetti .................... 99/280 |

FOREIGN PATENT DOCUMENTS

| | | |
|---|---|---|
| EP | 0 409 759 A1 | 1/1991 |
| EP | 0 424 326 A1 | 4/1991 |
| EP | 0 605 750 A1 | 7/1994 |
| EP | 0 766 943 A1 | 4/1997 |
| EP | 0 832 824 A2 | 4/1998 |
| GB | 2 392 899 A | 3/2004 |
| JP | 09-168486 | 6/1997 |
| JP | 11-120434 | 4/1999 |
| WO | WO 2006/090183 A | 8/2006 |

OTHER PUBLICATIONS

Coffee Guide (Feb. 13, 2008) available at http://fantes.com/coffees.html.*
International Search Report for PCT/NL2009/050557, mail date Apr. 29, 2010, 7 pages.
English Translation of Office Action for Russian Patent Application No. 2011115013, dated Feb. 25, 2014, 4 pages.
Examination Report for European Application No. 09788323.5, mail date Jan. 29, 2014, 3 pages.
First Examination Report for New Zealand IP No. 616551, mail date Oct. 14, 2013, 2 pages.
Second Office Action for Chinese Application No. 200980145805.2, mail date Feb. 21, 2014, 6 pages.
Communication for European Application No. 09788323.5, mail date Jan. 20, 2012, 7 pages.
Office Action for Chinese Application No. 200980145805.2, mail date Apr. 3, 2013, 19 pages.
Office Action for Japanese Application No. 2011-527761, mail date Nov. 5, 2013, 5 pages.
Search Report for Chinese Application No. 200980145805.2, mail date Mar. 22, 2013, 2 pages.

* cited by examiner

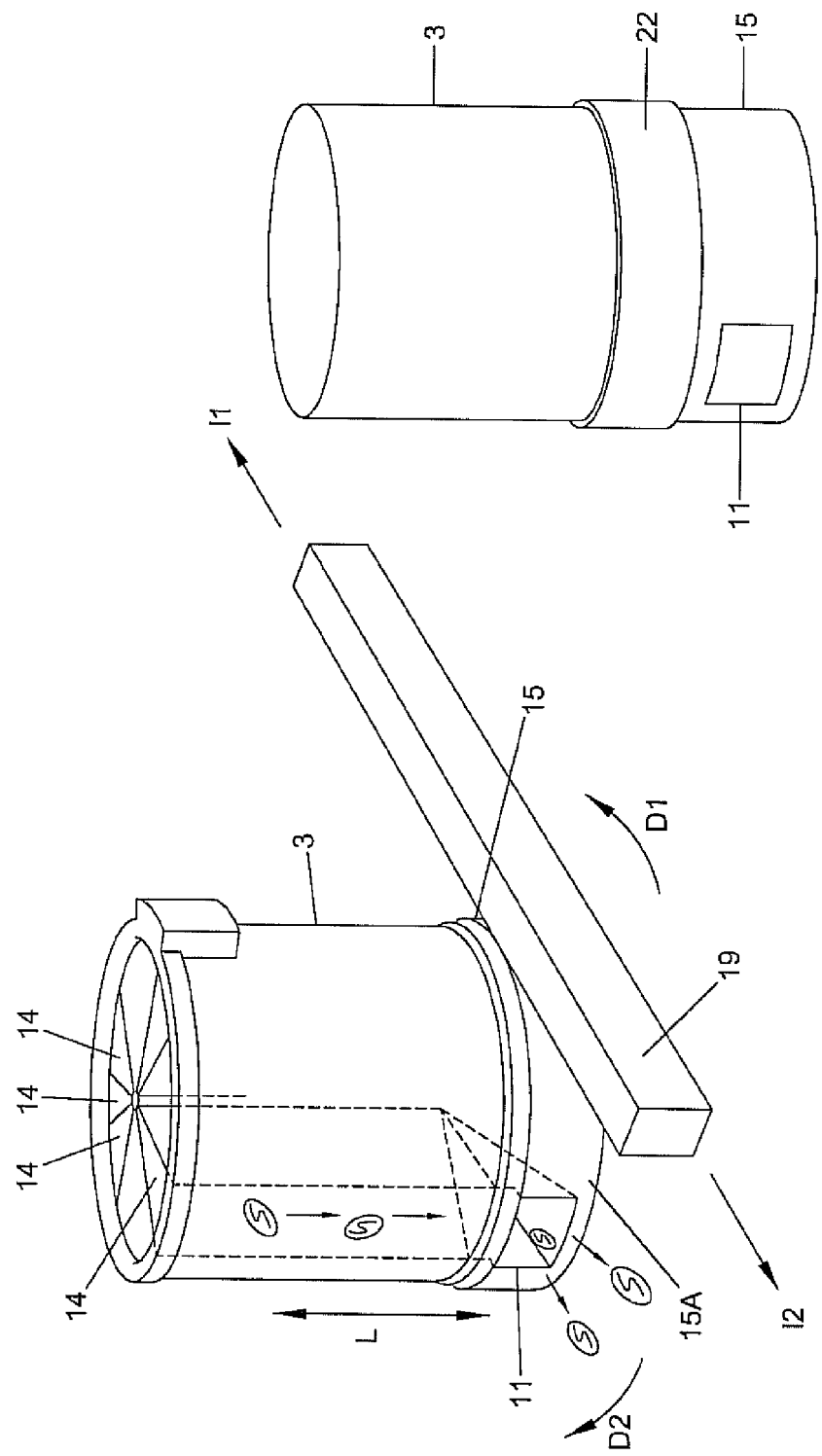

SYSTEM FOR PREPARING COFFEE BEVERAGE

CROSS-REFERENCE TO RELATED APPLICATIONS

The present application is a continuation application of International Patent Application Serial No. PCT/NL2009/050557 filed on Sep. 17, 2009; which claimed priority to The Netherlands Application Serial No. NL2001992 filed on Sep. 17, 2008 and The Netherlands Application Serial No. NL2002721 filed on Apr. 6, 2009. All three application are hereby incorporated herein by reference.

The invention relates to a system for preparing a coffee beverage, provided with a coffee making apparatus comprising a grinder for grinding coffee beans to obtain ground coffee, a coffee beverage preparation device arranged for, with supply of water to the ground coffee, preparing the coffee beverage, and a coffee outlet for dispensing the coffee beverage.

The invention further concerns a method for preparing coffee beverage.

The invention also concerns a method in which a dose of coffee beans is supplied from the coffee beans package to a grinder.

The invention furthermore relates to a method for dosing a dose of coffee beans for one cup of coffee beverage.

The invention furthermore concerns a coffee grinder, provided with a grinding chamber, grinding means for grinding coffee beans in the grinding chamber, and a coffee bean supply opening which is situated at an upper side of the grinding chamber for supplying the coffee beans to the grinding chamber.

The invention also concerns a coffee making apparatus.

The invention further concerns a coffee bean package provided with an envelope, at least one inner space which at least before use is filled with coffee beans, and a coffee bean outlet for passing out the coffee beans.

The invention furthermore concerns a coffee package provided with an inner space.

Existing coffee makers are for instance filter coffee makers and espresso machines. In the case of filter coffee makers, an amount of ground coffee is placed in a filter, after which hot water is poured onto the ground coffee. Upon the water passing the ground coffee, the ground coffee is extracted and a coffee beverage is obtained after which the coffee beverage, also referred to as filter coffee, flows through the filter while the coffee residues are left behind in the filter. It is customary for the hot water to flow through the ground coffee and the filter with the aid of gravity. After the hot water that corresponds with the amount of desired coffee beverage has been poured out over the ground coffee and has passed through the filter, the filter, at least if it is a disposable filter, can be thrown away with the ground coffee residue. Such a disposable filter typically consists substantially of paper. Also known are filters which are designed to be used more than once. After use, these filters are, for instance, cleaned, so that they can be filled with a next portion of ground coffee for preparing a new coffee beverage with the same filter.

In coffee making by means of espresso machines, also a filter is provided for holding an amount of ground coffee. Here, under a relatively high pressure, hot water is forced through the ground coffee and the filter. The coffee beverage thereby obtained is generally relatively thicker than filter coffee and typically has a stronger concentration of coffee extracts than filter coffee, at least given a comparable amount of ground coffee and supplied water. Typically, a metal filter is used.

Coffee beverage can be obtained in a known manner also with the aid of a percolator. In certain machines, such as, for instance, the Senseo® coffee machine of the producers Douwe Egberts® and Philips ®, for instance a paper disposable filter and a metal filter holder are used. Further known is instant coffee, where coffee concentrate or freeze-dried coffee is dissolved in hot water. In this latter method, no filter at all is used.

If a relatively long time has elapsed between the grinding of the coffee beans and the preparation of the coffee beverage with the ground coffee, there is a chance that a part of the flavor and aromas given by coffee beans is lost. Without wishing to be bound to any theory, it may be that the larger total surface of the particles of the ground coffee together, compared with the joint surface of unground coffee beans of the same weight, causes relatively more exchange between the surface and the ambient air than the total surface of the coffee beans, which can adversely affect the taste and odor of the coffee beverage. In current machines with grinders, the coffee beans are for that reason ground a short time before the preparation of the coffee beverage.

Incidentally, it may also be that flavors and odors connected with the coffee beans may be lost or diminish when unground coffee beans come into contact with ambient air for a long time. Generally, coffee beans and ground coffee are for that reason packaged in airtight and/or vacuum packages.

Certain coffee machines may be provided with grinders that are integrated in the coffee machine. Also, such coffee makers may be provided with coffee bean holders for feeding the coffee beans directly from the coffee beans package. Through operation of the coffee making apparatus, a part of the coffee beans from the coffee bean holder is ground, for the purpose of preparing a coffee beverage with this ground coffee. For instance, the grinder is directly operated by pressing a button, while, for instance, the number of times the button is pressed, or the length of time of pressing the button, can determine the amount of ground coffee. In automatic coffee makers with grinders, the amount of coffee beverage and the strength of the coffee beverage can be pre-selected and/or pre-set, in which case on the basis of the selected strength a dose of beans is supplied from the holder to the grinder so that an amount of coffee is obtained which, together with the predetermined amount of water, can result in a desired amount of coffee beverage of a desired strength.

Disadvantages of the above-mentioned principles can be that an amount of coffee beans is present in the coffee maker for a long time before it is ground, in that a complete pack of coffee beans is emptied into the coffee bean holder. This can adversely affect the taste and odor of the coffee beverage prepared with these coffee beans.

Also, in and around the grinder of existing coffee makers there are typically residues left of the preceding grinding runs. Study has shown that in conventional grinders typically 3-10 grams of one or more previous grinding runs are left behind in the grinder. These remainders of a previous grinding run may subsequently be entrained in a new grinding run, which can affect the taste of the coffee beverage. Moreover, if the coffee maker is filled with new coffee beans whose taste differs from the previous filling, the remainders of the previous filling may possibly be mixed with the ground coffee of the new coffee beans, so that not the desired taste inherent to the new coffee beans can be obtained. This may be disadvantageous in particular if the user regularly wishes to change the type of coffee beans. In conventional coffee makers, the user can circumvent this problem only by dosing the coffee bean holder in each case with a small amount of coffee beans. A disadvantage involved here, however, is that the coffee bean package then is not entirely emptied into the coffee maker and is left partly filled, so that the remaining coffee beans come into contact with ambient air. Typically, the coffee beans then are stored in the meantime in a separate, preferably airtight holder, such as an airtight closable pot or tin. These holders, however, can take up relatively much space.

In the current state of the art, after grinding and making the coffee beverage, either ground coffee is left behind in the coffee maker or coffee beans are left behind in the coffee maker, or the coffee bean package is not emptied entirely and coffee beans remain behind in the package, or separate coffee bean holders are used. There is no coffee maker that allows regularly changing taste of freshly ground coffee in an efficient and convenient manner.

SUMMARY

An object of the invention is to obviate at least one of the abovementioned disadvantages and/or other disadvantages.

In the following description, the feature that the coffee beans or ground coffee remain preserved or the feature of package-fresh may be understood to mean that the taste, aromas and/or volatile components of the coffee beans or ground coffee remains relatively preserved. Package-fresh in this description may additionally be understood to mean the particular condition of coffee beans shortly after the package has been opened. This package has preferably been applied in a packaging process preferably right after burning of the coffee beans. The package is preferably airtight and/or vacuumized so that the coffee beans can be preserved better. A particular 'kind' of coffee beans may be understood to mean that the kind in question pertains to a specific coffee bean-related taste, composition of aromas and volatile components of the coffee beans, or to a particular mix, composition or blend of coffee beans, preferably as stated on the package. If in this description different kinds of coffee beans are described, it may be understood that the related taste, aromas, mix, composition or blends are different. Unless stated otherwise, in this description coffee beans are understood to be burnt/roasted coffee beans. A predetermined dose in this description may for instance be understood to mean that the dose has been set beforehand, for instance by a configuration of a circuit or mechanical system of the coffee maker determined during manufacture, or that the dose has been set by the user just prior to coffee making.

In a first aspect, to that end, the invention provides a system for preparing coffee beverage according to claim 1.

The system comprises a coffee making apparatus with grinder and a coffee bean package. Before the coffee bean package has been opened a first time for consumption, it is closed off to prevent and/or act against contact between the coffee beans and ambient air. For instance, the package is closed airtight and/or vacuumized.

The coffee bean package can be connected directly to the coffee making apparatus and/or to the grinder, with the coffee package being opened by the coffee making apparatus so that the coffee beans can be passed directly from the package to the grinder. Here the package itself is connected to the coffee making apparatus so that package-fresh coffee beans can be ground and extracted. It is also possible that the coffee beans which are stored in the coffee bean package are treated by some means in the coffee bean package or the coffee making apparatus or by some means which is part of both the coffee making apparatus and the coffee bean package. For example the beans may be (additionally) roasted in the coffee bean package upon being transported into the coffee making apparatus. Hence in that case the beans which are stored in the package are not the same as the beans which are transported from the package into the coffee making apparatus. Similarly the system may be provided with spraying means to modify the beans which are stored in the package when they are transported towards the grinder. The spraying means may be part of the coffee making apparatus, the package or may be divided over the coffee making apparatus and the coffee bean package.

Coffee beans in this description may be understood to cover also fragmented coffee beans, that is, coffee bean fragments, which coffee bean fragments are still to be ground for extracting desired coffee beverage. The coffee beans are for instance broken, before they are packaged. In an embodiment, at least a part of the coffee beans in the coffee bean package is divided into about thirty or less, in particular about fifteen or less, more particularly about ten fragments or less. One coffee bean fragment then comprises for instance one-thirtieth part, in particular one-fifteenth part, more particularly one-tenth part or more of a coffee bean. For instance, the coffee bean fragments comprise a half or a quarter of a coffee bean. An advantage of the use of coffee bean fragments compared with whole coffee beans can be that coffee bean fragments can be supplied to the grinder relatively simply and/or that the package can be closed off relatively simply. This is because the coffee bean fragments are relatively small and hence can slide relatively easily through openings in the package and the apparatus and/or will block the coffee bean outlet and/or closing means less easily. As the coffee beans may beforehand have been divided into fragments, though not ground, in the meantime comparatively more bean surface can come into contact with any ambient air than would be case with whole coffee beans. On the other hand, less bean surface will come into contact with air than would be the case with ground coffee, so that coffee bean fragments can be preserved better than ground coffee beans. Only just before preparation of the coffee beverage are the coffee bean fragments ground for obtaining coffee beverage. In this description, therefore, coffee bean may also be understood to include a fragmented coffee bean, that is, which is still to be ground for preparing the desired coffee beverage.

The coffee package can for instance comprise an amount of coffee beans which is intended for preparing a consumption of coffee beans, for instance of a magnitude of 1 cup of coffee. After preparing the one consumption of coffee beverage, the coffee package can be uncoupled from the machine and, for instance, be thrown away.

The coffee package, when first opened, can also comprise an amount of coffee beans which is intended for preparing multiple consumptions of the coffee beverage.

According to another aspect of the invention, claims 2 and 11 apply.

The particular feature here is that the coffee bean package is provided with closing means which can assume an open and closed condition, wherein in the open condition coffee beans can be supplied from the coffee bean package to the coffee making apparatus and wherein in the closed condition the closing means close off the coffee bean package in itself. The closing is for example such that when it is uncoupled from the coffee making apparatus, the exposure of the coffee beans in the coffee bean package to ambient air is possibly to some extent prevented, or at least the coffee beans do not fall out of the coffee bean package.

In particular it holds that the coffee bean package is provided with closing means for so closing off the coffee bean package in itself when it is uncoupled from the coffee making apparatus that during uncoupling no coffee beans are lost from the package, and in particular no coffee beans can be passed into or out of the package. This can have as an additional advantage that coffee beans that are present in the coffee package after this coffee package has been uncoupled may be better preserved and remain fresher. This is especially of importance when the coffee bean package after first being connected to the coffee making apparatus and being opened is uncoupled from the coffee making apparatus while in the coffee package still an amount of beans is present that can be used for preparing at least one consumption of coffee beverage (for instance of a magnitude of a cup of coffee) or for preparing a jug of coffee. Such a situation can also arise when a package which comprises beans just for one consumption (for instance of a magnitude of a cup of coffee) is connected to the coffee making apparatus and is subsequently uncoupled again without having been used. Also such a situation can occur when the coffee bean package comprises an amount of beans which is intended for preparing multiple consumptions. When such a package is connected to the coffee making apparatus and a number of consumptions of coffee beverage are prepared with coffee beans from this coffee bean package, while subsequently the coffee bean package is uncoupled from the coffee making apparatus while beans are still present in the coffee bean package that can be used for one or more consumptions of coffee beverage, it is very favorable that the uncoupled coffee bean package is closed to keep the beans inside and preferably keep them fresh longer. Subsequently a different coffee bean package can be connected to the coffee making apparatus for preparing a different type of coffee beverage. Different coffee bean packages can hence comprise different kinds of coffee beans and a consumer can at will alternately connect and uncouple at the coffee making apparatus different coffee bean packages that still contain beans while the uncoupled coffee bean package is closed off, which is favorable when it still contains coffee beans. Moreover, the closing means can prevent further coffee beans from being passed back into the package, with the coffee beans in the package being of a predetermined kind or taste.

Operating the closing means can be carried out by hand. It is also possible, however, that the system or the coffee making apparatus is provided with opening means to bring the closing means into the open condition when the package is being connected to the coffee making apparatus or when the coffee making apparatus has been connected to the coffee making apparatus and coffee beans are to be delivered from the coffee bean package to the coffee making apparatus for preparing the coffee beverage. Accordingly, opening the package can then be carried out by the coffee making apparatus at a suitable moment.

Furthermore it is possible that the system is provided with a closing mechanism which is arranged for bringing the closing means of the coffee bean package, when the coffee bean package is being uncoupled from the coffee making apparatus, automatically into the closed-off condition. Such a closing mechanism can be part of the package and/or the coffee making apparatus and/or the opening means. It is also possible that the system is provided with a closing mechanism to close the coffee bean package while it is still connected to the coffee making apparatus and is not used for delivering coffee beans to the grinder. Such a closing mechanism can be part of the package and/or the coffee making apparatus.

In an embodiment, the coffee bean package is provided with a coffee bean outlet, and the coffee making apparatus is provided with a corresponding coffee bean inlet. The coffee bean inlet is connected with the coffee bean outlet, so that the coffee beans can be passed to the grinder. In a further embodiment, the coffee bean inlet can be detached from the coffee bean outlet, for instance so that a second coffee bean package can be connected to the coffee making apparatus. Here, different coffee bean packages, which for instance comprise different kinds of coffee, can be exchanged.

In yet another embodiment, the coffee bean outlet is closable, for instance through said closing means. In this embodiment, the coffee bean package can be closed off for instance when taking the package out of the coffee making apparatus, so that the package can in principle be separated from the coffee making apparatus at any time, also when the package is not entirely empty. Preferably, the package is then closed off airtight and/or vacuumized, so that the taste and/or extracts of the residual coffee beans in the package can remain preserved longer. For instance, the coffee making apparatus is provided with a closing mechanism which automatically closes off the closure of the coffee bean outlet upon uncoupling of the coffee bean inlet. Also, the package, after supply of the coffee beans to the grinder, can be closed off so that the coffee beans in the package, also when the package is connected to the coffee making apparatus, can be remain preserved comparatively longer.

Preferably, when connecting the coffee bean package with the coffee making apparatus by hand, the coffee bean outlet and the coffee bean inlet are connected with each other. The outlet and inlet can preferably be uncoupled also by hand, for instance by taking the package out of the coffee making apparatus.

In an embodiment, the system is provided with a dosing device. The dosing device can contribute to the purpose that not more and not less than approximately a predetermined dose of coffee beans is supplied to the grinder. In a further embodiment the dosing device is included in the coffee bean package. For instance, the coffee bean package is provided with the predetermined dose of coffee beans so that the package can in principle be emptied into the grinder. In a further embodiment, the coffee bean package is provided with multiple compartments each provided with a predetermined dose of coffee beans. For instance, each compartment is provided with a coffee bean outlet. In a still further embodiment, the package is provided with a movable dosing device, which for instance can be controlled by the apparatus, for instance allowing multiple dosages to be passed out of the package.

In another embodiment, the dosing device is included in the coffee making apparatus. In this way, a predetermined dose of coffee beans can be taken from the package, while for instance a residual part remains behind in the package. The system, in particular the dosing device, can for instance close off the package after the predetermined dose has been let out of the package. The system can hence be provided with means to close off the coffee bean package while it is still connected to the coffee making apparatus and is not used for delivering coffee beans to the coffee making apparatus. Also, it is possible that closure of the package is done only when it is uncoupled from the coffee making apparatus. In a still further embodiment, the dosing device is partly present in the coffee making apparatus and partly in the package, while the two parts can cooperate with each other.

A predetermined dose of coffee beans comprises for instance at most about 50 grams or less, in particular about 25 grams or less, more particularly about 15 grams or less, for instance about 7 grams, or at least between 4 and 10 grams. In an embodiment, the predetermined dose is based on an amount of coffee beans that is needed for preparing one cup of coffee beverage, for instance coffee beverage of an amount by volume of 20 to 500 milliliters, while the strength could be co-predetermined by the user, for instance through an operating element which is present on the apparatus. The predetermined dose may depend on an amount of coffee beverage and/or strength of the coffee beverage which is set by the user. The dose may be determined for instance on the basis of weight, volume, or amount of coffee beans. It is also possible that larger amounts of coffee beverage are prepared, such as, for instance, a jug of coffee.

In an embodiment, the grinder is arranged so that the coffee making apparatus comprises substantially no unused ground coffee anymore after grinding has been stopped. This prevents ground coffee of a grinding run remaining behind and being entrained with a next grinding run. Preferably, the system is arranged such that the grinder is only stopped when the whole supplied dose of coffee beans has been ground. A predetermined dose can then be wholly ground and passed to the coffee beverage preparation device, while after grinding upstream of the grinder substantially no coffee beans are present and in particular the grinder is empty, that is to say, the grinder does not comprise any coffee beans or ground coffee anymore. Downstream of the grinder towards the coffee beverage preparation device, preferably, substantially no ground coffee is present anymore either. In particular, a dose of ground coffee beans is hence completely supplied to the coffee beverage preparation device. With such a grinder, the initially connected coffee bean package with coffee beans of a first kind can be exchanged for a second coffee bean package with coffee beans of a second kind, with the apparatus being substantially clean for connection of the second coffee beans package, so that the desired taste that is related to the second kind of coffee beans can be achieved. In the package, coffee beans may be left behind after the whole dose has been ground. Preferably, the package can be closed off before and after grinding.

In particular it holds, therefore, that a coffee bean package is connected to a coffee making apparatus, wherein a dose of coffee beans is supplied from the coffee bean package, via a coffee bean transport path of the coffee making apparatus, which extends from the coffee bean package when connected to the coffee making apparatus to a grinder of the coffee making apparatus, to the grinder, wherein the dose of coffee beans is ground by the grinder, wherein the ground coffee is used for making coffee beverage with supply of water, wherein substantially no unused ground coffee or coffee beans remain behind in the grinder and in the coffee bean transport path after the coffee beverage has been prepared. Preferably, the ground coffee is transported under the influence of gravity from the grinder to a coffee preparation device which, in use, supplies water to the ground beans for preparing the coffee beverage. As a result, no ground coffee is left behind in the grinder and downstream of the grinder towards a coffee preparation device. In particular, it holds furthermore that the ground coffee beans are transported from the coffee bean package to the grinder under the influence of gravity. In particular, it holds here that the grinder is only stopped when, at least substantially, the whole amount of coffee beans supplied to the grinder has been ground. The result is that in the grinder and upstream of the grinder, no coffee beans belonging to the doses are left behind.

In an embodiment, the grinder is provided with a grinding chamber, grinding means, a coffee bean supply opening at the upper side of the grinding chamber, and a ground coffee discharge opening at the lower side. In particular, the grinding means can be arranged for passing-through the coffee beans and/or the ground coffee by means of gravity. Preferably, the direction of passing-through is substantially vertical. In this way, it can be achieved that the whole supplied dose of coffee beans is passed through the grinder, without coffee beans and/or ground coffee remaining behind in the grinder.

In an embodiment, the inner space of coffee bean package when not used before comprises at least 20 grams, more particularly at least 50 grams, still more particularly at least 70 grams and still more particularly at least 200 grams of coffee beans. From this, multiple dosages of coffee beverage can be dosed. Since the coffee making apparatus may be suitable for preparing different kinds of coffee beverage in succession, that is, based on different kinds of coffee bean, it may be favorable to provide coffee bean packages of relatively small volumes. The coffee bean package may be disposable, which inter alia can be of benefit to the convenience in use and can keep production costs low. The package can be largely manufactured from environment-friendly disposable, degradable or reusable material, for instance foil, paper or cellulose. In another embodiment, the package may comprise only one dose of coffee beans, so that the system after each connection of the package processes one dose of coffee beans. It then holds, for instance, that the inner space when the package has not been used before comprises an amount of coffee beans for preparing one consumption of coffee such as a cup of coffee, preferably about 5-10 grams, more particularly about 6-8 grams of coffee beans.

In a second aspect, the invention provides a method for preparing coffee beverage.

By connecting the coffee bean package directly onto the coffee making apparatus, the coffee beans can for example be passed from the package directly to the grinder, without the coffee beans first needing to be passed out of the package and into a container of the coffee making apparatus, as is the case in conventional systems. This can yield convenience of use in combination with coffee beverage prepared from freshly ground coffee beans. Moreover, a coffee kind as desired can be directly prepared.

In a third aspect, there is provided a method wherein a coffee bean package is connected to a coffee making apparatus.

In the above methods, after supplying a dose of coffee beans to the grinder, ground coffee can be prevented from being left behind, so that a second dose of coffee beans, which is possibly of a second kind, is not mixed with ground coffee left behind, which may be of a different kind. Preferably, all coffee beans supplied from the package are ground, so that no coffee beans are left behind in the coffee making apparatus either, except for the part that is left behind in the package. On the other hand, for instance extracted ground coffee may be left behind in the preparation device. The ground coffee left behind and already used can for instance be removed from the apparatus automatically or by the user.

In a fourth aspect, there is provided a method for dosing a dose of coffee beans for one cup of coffee beverage.

In such a method, a predetermined dose is taken from the package and ground for preparing at least one cup of coffee beverage. The needed dose per cup of coffee beverage can weigh for instance less than 20 grams, in particular 15 grams or less, more particularly between 4 and 10 grams, for instance about 7 grams. The coffee bean package can be closed off so that the packaged coffee beans can remain preserved.

In an embodiment of one of the above-mentioned methods, different coffee beans packages with different kinds of coffee beans can be connected to the coffee making apparatus one after the other. In another embodiment, the package is closed off after a dose of coffee beans has been passed out, with a residual amount of coffee beans remaining behind in the package. As a result, the package can be connected to the apparatus and uncoupled therefrom several times.

In another embodiment, the coffee bean package is provided with an inner space which contains the predetermined dose of coffee beans. The complete contents of this package can be supplied as a predetermined dose to the grinder. In a further embodiment, the inner space of the coffee bean package comprises multiple compartments, each containing the predetermined dose of coffee beans. The coffee bean package, after being emptied, can be thrown away.

In a fifth aspect, there is provided a coffee grinder.

By passing the coffee beans through the grinder by gravity, it can be accomplished that no or hardly any residues of ground coffee remain behind in the grinder. All ground coffee beans and/or ground coffee will be led towards the ground coffee discharge opening by gravity. Preferably, the grinder is arranged not to stop grinding until after a complete dose of coffee beans has been passed through it. In this way, in each preparation, freshly ground coffee can be prepared without residues from previous grinding runs being used. Other effects, advantages and further embodiments of such a grinder will also appear from the above description.

In a sixth aspect, there is provided a coffee making apparatus.

By designing the coffee making apparatus with a grinder where no coffee residues remain behind after grinding, the grinder can remain relatively clean between different grinding runs. Further embodiments of the coffee making apparatus may be designed with a connecting device for connecting a coffee bean package, and a dosing device for dosing coffee beans from the package. Further advantages, embodiments and effects of this aspect can be taken from the above description.

In a seventh aspect, there is provided a coffee bean package.

By providing such a closable package, a dose of coffee beans can be taken from the package several times, after which the residual coffee beans can remain in a closed package. In further embodiments, the package is provided with multiple compartments and/or a dosing device.

In an eighth aspect, there is provided a coffee bean package.

An inner space of a coffee bean package can comprise multiple compartments, wherein each compartment can be provided with a desired, predetermined dose of coffee beans. In this way, a possibly complex dosing device with too many moving parts can be avoided and each compartment can be emptied for obtaining the predetermined dose of coffee beans. The corresponding coffee making apparatus can for instance draw coffee beans from one compartment for instance through a coffee bean inlet. The remainder of coffee beans which are still packaged then remain packaged, for instance vacuum-packed and/or in an inner space with a lesser amount of oxygen than in the environment, or at least in an inner space with a shelf life enhancing gas. In a next coffee preparation, a next compartment can then be emptied. A package with multiple compartments can moreover have the advantage that multiple kinds of coffee can be stored in one package. After use, the package can be thrown away.

In the foregoing it has been indicated that the closing means can close off the coffee beans in the package. In an embodiment, the closing means can transmit at least substantially no air from the environment to the beans in the package and vice versa when there is a pressure difference between the space in the package in which the beans are present and the environment which is at most 1.1, preferably 1.2, more preferably 1.3 and still more preferably 1.5 bar.

Furthermore, it holds preferably that the amount of air that enters the coffee package is at most equal to the volume of the beans supplied from the coffee bean package to the coffee making apparatus. This can be realized, for instance, in that the coffee bean package is connected airtight to the coffee making apparatus and in that the interior of the system where the beans and the ground coffee can be present is designed to be at least substantially airtight with respect to an environment ('the outside world') of the system. For instance, the coffee bean inlet and the coffee bean outlet are airtight connected with each other. Said interior of the system is for instance formed by the inner space of the package, a coffee bean transport path from the package to the grinder, the grinder, a ground coffee bean transport path from the grinder to the coffee preparation device, and the coffee preparation device. Air then present, for instance, in the coffee bean transport path will then be displaced by beans supplied from the package to the coffee bean transport path. This air then flows into the package where the beans came from.

BRIEF DESCRIPTION OF THE DRAWINGS

Further embodiments and effects according to the invention are represented in the dependent claims and will also appear from the description, in which the invention is described in more detail on the basis of several exemplary embodiments with reference to the appended drawings. In the drawings:

FIG. 3 shows a coffee bean package with multiple compartments, a dosing device, and a corresponding activation element;

FIG. 4 shows a coffee bean package with a closure;

DETAILED DESCRIPTION OF EXEMPLAR EMBODIMENTS

Figure 1:
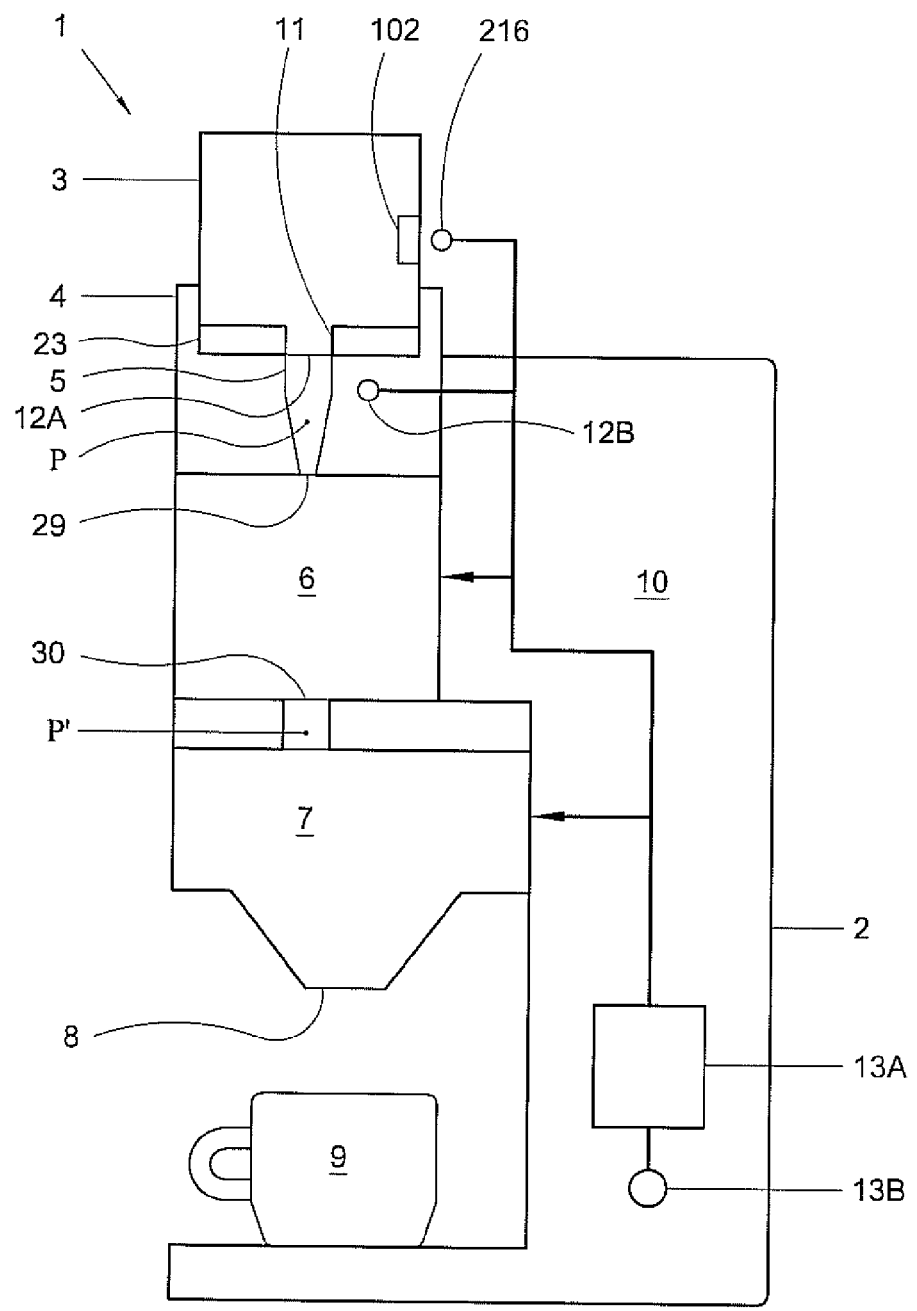
FIG. 1 shows in side elevation a schematic diagram of a section of a system for preparing a coffee beverage.

In this description the same or corresponding parts have the same or corresponding reference numerals. In the drawing, embodiments are shown only by way of example. The elements used there are mentioned only as examples and should not be construed as limiting the invention. The proportions of the embodiments shown in the figures may be represented schematically and/or exaggeratedly and should not be construed to be limiting.

In FIG. 1 a system 1 for preparing coffee beverage is shown. The system comprises a coffee making apparatus 2 and a coffee bean package 3. A connecting device 4 may be provided for preferably directly connecting the coffee bean package 3 onto the coffee making apparatus 2.

The coffee bean package 3 has an inner space which at least before use is filled with the coffee beans. Preferably, the coffee bean package 3, at least before it is placed on the coffee making apparatus 2, is in itself closed off such that exposure of the coffee beans to ambient air is prevented. Preferably, to that end, the package 3 is closed off airtight and/or vacuumized. The coffee bean package 3 can be a disposable package and/or for instance be manufactured substantially from paper and/or foil and/or cellulose and/or plastic and/or tin, while the package 3, after being emptied, can be thrown away.

The connecting device 4 may be arranged for receiving the coffee bean package 3 in whole or in part. In an embodiment, the coffee bean package 3 is for instance provided with relatively stiff guide parts, which can serve as a guide along the connecting device 4, for connecting the coffee bean package 3 to the coffee making apparatus 2. The guide parts can for instance comprise stiff walls, or a conically shaped wall around the coffee bean outlet 11, so that the coffee bean outlet 11 can be guided to the coffee bean inlet 5. For instance, the connecting device 4 and the package 3 are provided with corresponding guide parts, while the guide parts can comprise for instance screw thread, a snap connection, a bayonet closure, other connection possibility, or simply guide means in the form of a marker.

In an embodiment, a coffee bean inlet 5 is provided for supply of the coffee beans from the coffee bean package 3 to a grinder 6, when the package 3 is connected to the coffee making apparatus 2. In the coffee making apparatus, between the coffee bean inlet 5 and the grinder 6, extends a coffee bean transport path P. The grinder 6 is arranged for grinding the coffee beans to obtain ground coffee. The ground coffee can be supplied to a coffee preparation device 7. The coffee preparation device 7 is arranged for preparing coffee beverage, with supply of water to the ground coffee. A coffee outlet 8 is provided for dispensing the coffee beverage, preferably to a cup 9, mug, pot or thermos bottle or the like. The coffee preparation device 7 can for instance be arranged to supply hot water under pressure, as in an espresso machine, and/or be arranged as a pour-on drip extraction system, as with a filter coffee maker. Also, the coffee preparation device may be arranged to prepare the coffee beverage under slightly elevated pressure in the order of 1.1-2, in particular 1.1-1.5 bar. A water provision 10 may be provided for providing water, preferably hot water, for the preparation of coffee beverage. For heating the water, at least one heat element may be provided.

In an embodiment, the package 3 may be provided with a coffee bean outlet 11 which preferably can be connected with the coffee bean inlet 5 for supplying coffee beans from the inner space of the coffee bean package 3 to the grinder 6. Upon connection of the coffee bean package 3 with the coffee making apparatus 2, the inner space of the package 3 can, preferably by means of the coffee bean outlet 11, be connected with the coffee bean inlet 5 for supplying the coffee beans. The coffee bean inlet 5 and the coffee bean outlet 11 may be arranged to be guided along each other. Furthermore, the coffee bean inlet 5 and the coffee bean outlet 11 may be detachably connected with each other for uncoupling and/or separating the coffee beans package 3 from the coffee making apparatus 2. The system 1 is for instance arranged such that the coffee bean outlet 11 can be uncoupled from the coffee bean inlet 5 by hand for separating the coffee bean package 3 and the coffee making apparatus 2 from each other. The coffee bean package 3 may be provided with closing means 12A for closing off the coffee bean outlet 11 when the coffee bean outlet 11 is uncoupled from the coffee bean inlet 5. The closing means 12A preferably involve a substantially airtight closure and/or allow the package 3 to be vacuumized and/or to remain under vacuum, also after the package 3 is taken off the coffee making apparatus 2. The closing means 12A can also close off the coffee bean package 3 when the package 3 is connected to the coffee making apparatus 2, for instance while the coffee bean inlet 5 and coffee bean outlet 11 are coupled, so that also during connection and coupling, respectively, contact between the coffee beans and the ambient air can be prevented. The closing means are of such strong design that if a coffee bean should be present in the opening to be closed, the closing means will break this bean in order to be able still to close the opening off completely. The closing means 12A can then open for delivering coffee beans from the package to the grinder 6. After delivering the coffee beans, the closing means 12A can close the package again. Opening of the closing means 12A can be carried out with opening means 12C, which for instance can be operated by hand and are provided with a handle on the package. Also, the system, in particular the coffee making apparatus, may be provided with the opening means 12C for opening the closing means 12A. This will be set out in more detail later with reference to an example according to FIG. 9. The opening means 12C may be arranged for opening the coffee bean package if the coffee bean package is connected to the coffee making machine. The opening means 12C may also be arranged for opening the coffee bean package as soon as the coffee bean package is connected to the coffee making apparatus. The opening means 12C may also be arranged for opening the coffee bean package when the coffee making apparatus is activated to prepare a beverage wherein optionally the opening means are arranged to close the coffee bean package after that beans are transported from the coffee bean package to the coffee making apparatus for preparing the beverage, The opening means 12C may control the closing means 12A for opening and/or closing the coffee bean package. The opening means itself may be controlled by a control unit 13A.

Figure 9:
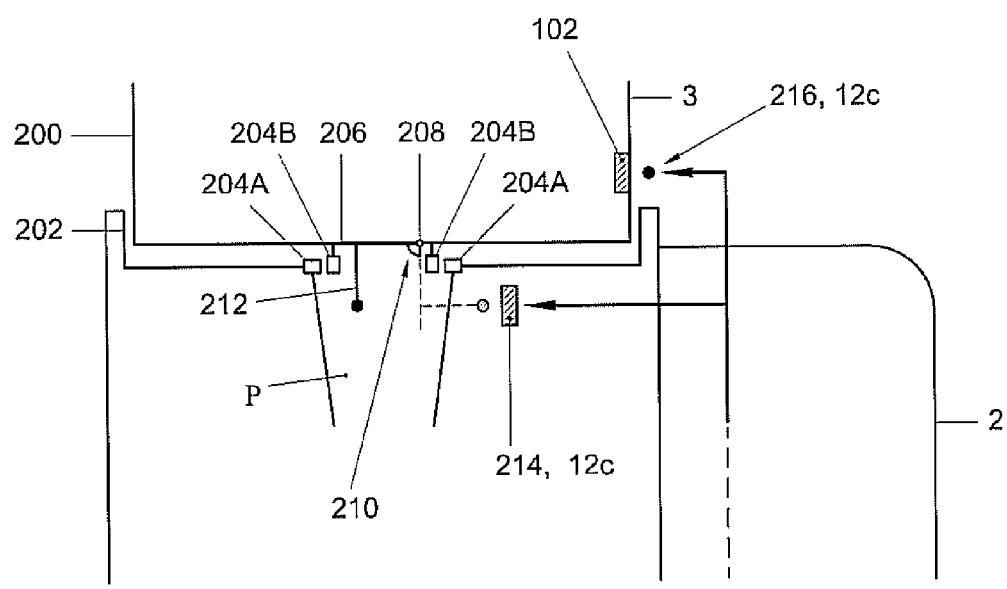
FIG. 9 schematically shows a possible embodiment of a part of the system.

The system 1 may further be provided with a closing mechanism 12B which automatically closes off the coffee bean outlet 11 with the closing means 12A, for instance when the coffee bean outlet 11 is uncoupled from the coffee bean inlet 5. The closing mechanism 12B may also be arranged to close off the coffee bean outlet 11 with the closing means 12A after supply of coffee beans to the grinder 6, also when the package still remains connected to the coffee making apparatus. The closing mechanism 12B may be arranged in the coffee making apparatus 2 and/or in the coffee bean package 3. The closing mechanism 12B can for instance comprise a springing element, which activates for instance a flap, or a slide and/or rotary part of the closing means 12A so that the package 3 is closed off. The system may then be further provided with the opening means 12C to open the closing means 12A, for instance during the period that the package is connected to the coffee making apparatus or only during the period that the package is connected to the coffee making apparatus and coffee beans are to be drawn from the package for preparing a coffee beverage. The closing mechanism 12B can also be driven mechanically and/or electrically for actively activating the closing means 12A. The closing mechanism 12B may for instance be provided with an electromagnet 12B for operating the closing means 12A. The closing mechanism 12B can then, for instance, be controlled by a control device 13A of the coffee making apparatus, which, for instance, in addition to controlling the closing mechanism 12B, also controls the grinder 6 and the coffee preparation device 7. The closing mechanism 12C may be part of the opening means 12B An example is given in FIG. 9. In FIG. 9, the coffee bean package is manufactured from tin and provided with a cylindrical upstanding sidewall 200. This upstanding sidewall 200 slides along an upstanding inner wall 202 of the coffee making apparatus when the package is to be connected to the coffee making apparatus. The coffee bean inlet 5 is provided with a first part 204A of a bayonet closure, and the coffee bean outlet 11 is provided with a second part 204B of the bayonet closure. Thus the earlier-mentioned connecting device 4 in this example comprises the bayonet closure 204A, 204B and the walls 200, 202. A user can connect the parts 204A and 204B of the bayonet closure with each other by rotating the package ⅛ turn around its axial axis relative to the coffee making apparatus. Thus, the coffee bean outlet and the coffee bean inlet are directly connected with each other. The closing means 12A of the coffee bean package are provided with a flap 206 which is connected with the rest of the package through a hinge 208. The hinge 208 is provided with a spring 210 which presses the flap 206 to a closed position. The closing mechanism 12B hence comprises the spring 210. The flap 206 is further provided with a projecting pin 212 of soft iron. Furthermore, the coffee making apparatus is provided with an electromagnet 214 which is operated by the control device 13A. The control device is connected with a sensor 216 (see FIG. 1) which detects when a coffee bean package is connected to the coffee making apparatus. When a user operates an operating element 13B of the control device 13A and when the sensor detects the presence of a package, the control device 13A will activate the electromagnet so that the pin 212 is attracted by the electromagnet and the flap 206, against the pressure of the spring 210, swings open in the direction of the arrow 218. The open position of the flap 206 (closing means 12A) is shown in FIG. 9. Thereupon the control device activates a dosing device 23, to be described in more detail below, for delivering predetermined doses of coffee beans from the package to the coffee making apparatus. Also, the control device activates the grinder 6 for grinding the delivered doses of coffee beans. The ground coffee beans are thereupon supplied to the coffee preparation device 7. This is also activated by the control device 13A for, with supply of hot water, preparing the coffee beverage. The control device 13A, the sensor 216 and the electromagnet are here part of the earlier-mentioned opening means 12C for opening the package. When a user uncouples the package from the coffee making apparatus, the flap 206 will go to its closed condition under the influence of the spring 210. This also happens if the electromagnet 214 were still energized, because the magnetic field remote from the coffee making apparatus is then too weak to keep the flap 206 in its open position. It is also possible that the control device, upon detecting with the sensor 216 that the package is being uncoupled from the machine, deactivates the electromagnet. In that case, the electromagnet 214 and the control device 13A together with the spring 210 function as part of the closing mechanism 12A. It is further possible that the control device deactivates the electromagnet after each preparation of an amount of coffee beverage, also while the package remains connected to the coffee making apparatus. In that case, too, the control device 13A and the spring 210 form part of the closing mechanism 12A. The opening means 12C hence can open the package as soon as a connected package is detected with the sensor or as soon as with the sensor a connected package is detected and a user activates the operating element for preparing a coffee beverage.

In an embodiment, the control device can be activated through detection of the package 3 by the sensor 216. The sensor 216 can for instance comprise an electric, magnetic and/or an optical sensor 216. The sensor 216 can also comprise a mechanical detection system, for instance provided with a switch which can be activated by a corresponding part of the package 3. The mechanical parts of the package 3 and the sensor 216 can have corresponding shapes so that the package 3 serves as a key to be able to operate the apparatus 2. In a further embodiment, the package 3 is for instance provided with a radiofrequency chip with code, and the apparatus may be provided with a radiofrequency reader. The control system may be arranged to recognize predetermined codes corresponding to the package 3, so that the control system activates the apparatus 2 only when the code on the radiofrequency chip of the package 3 corresponds to the predetermined code, or one of the predetermined codes.

Preferably, in use, the closed coffee bean package 3 with coffee beans is connected directly to the coffee making apparatus 2. When connecting it, the package 3 may be opened, whereby after or upon connection of the package 3 onto the coffee making apparatus 2 the coffee beans are supplied from the package 3 to a grinder 6. Preferably, the coffee beans from the package 3 are dosed such that enough ground coffee for one cup of coffee beverage can be delivered to the preparation device 7. The dose can for instance be less than 20 grams. After the coffee beans have been ground, the package 3 can be taken off. Upon taking off the package 3 from the coffee making apparatus 2, the package 3 may be thrown away, or again, preferably automatically, be closed off with the closing means 12A, as already explained.

The coffee making apparatus in this example is so arranged that after the preparation of the coffee beverage, substantially no unused ground coffee or coffee beans remain behind in the grinder 6 and in the coffee bean transport path P (see FIG. 1).

To this end, in this example, the system is so arranged that, in use, the grinder 6 is not stopped until at least substantially the whole amount of coffee beans supplied to the grinder have been ground. This is regulated in this example by the control device 13A. Due to gravity no ground coffee will remain behind in the coffee beans transfer path. All beans will be grinded.

The coffee making apparatus in this example is also so arranged that after the preparation of the coffee beverage, substantially no unused ground coffee or coffee beans remain behind in a ground coffee transport path P' (see FIG. 1).

'It holds to this end in this example, that the system is so arranged that the ground coffee beans are transported from the grinder to the coffee preparation device 7 under the influence of gravity. This appears from the fact that the ground coffee transport path P' (see FIG. 1) which extends between the grinder and the coffee preparation device, extends in vertical direction, so that ground coffee is driven from the grinder 6 to the coffee preparation device 7. After that a beverage has been prepared by means of the coffee preparation device 7, the used ground coffee is removed from the coffee preparation device in a well known manner for those skilled in the art.

Further, it holds to this end in this example that the system is so arranged that the ground coffee beans are transported from the coffee bean package to the grinder under the influence of gravity. This appears from the fact that coffee bean transport path P extends in vertical direction, so that coffee beans are automatically driven completely from the coffee bean package to the grinder 6. Preferably, it holds that the grinder is provided with a grinding chamber 27, grinding means 28 for grinding coffee beans in the grinding chamber, a coffee bean supply opening 29 which is situated at the upper side of the grinding chamber for supplying the coffee beans to the grinding chamber and a ground coffee discharge opening 30 which is situated at a lower side of the grinding chamber (see FIGS. 1 and 8).

In an embodiment, the system 1 may be provided with a dosing device 23 for supplying a predetermined dose of coffee beans to the grinder 6. In a first embodiment, the dosing device 23 is for instance included in the coffee making apparatus 2. Also, the dosing device 23 may be included partly in the package 3 and partly in the coffee making apparatus 2. Preferably, the dosing device 23 is arranged such that a dose of coffee beans can be supplied to the grinder 6 for making one cup of coffee beverage. The volume of one cup of coffee beverage can for instance vary from about 20 milliliters, for instance for a small amount of strong espresso, to 400 milliliters or more, for instance for a large cup of coffee beverage. The weight of a dose of coffee beans can for instance be approximately equal to 50 grams or less, in particular 20 grams of less, more particularly 15 grams or less. Preferably, the dose approximately corresponds to a weight of between 4 and 10 grams, in particular about 7 grams. For instance, the dosing device 23 can be operated through an operating element 13B of the control device 13A, for setting the dose of coffee beans, allowing the dose to be determined by the user during operation. Also, the amount of water to be supplied can be determined through an operating element.

Figure 2A:
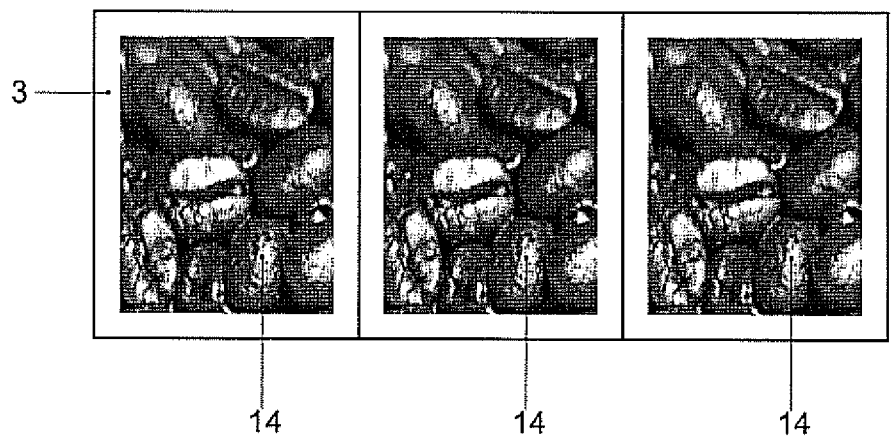
FIG. 2A schematically shows a section of a coffee bean package with multiple compartments in side elevation.
Figure 2B:
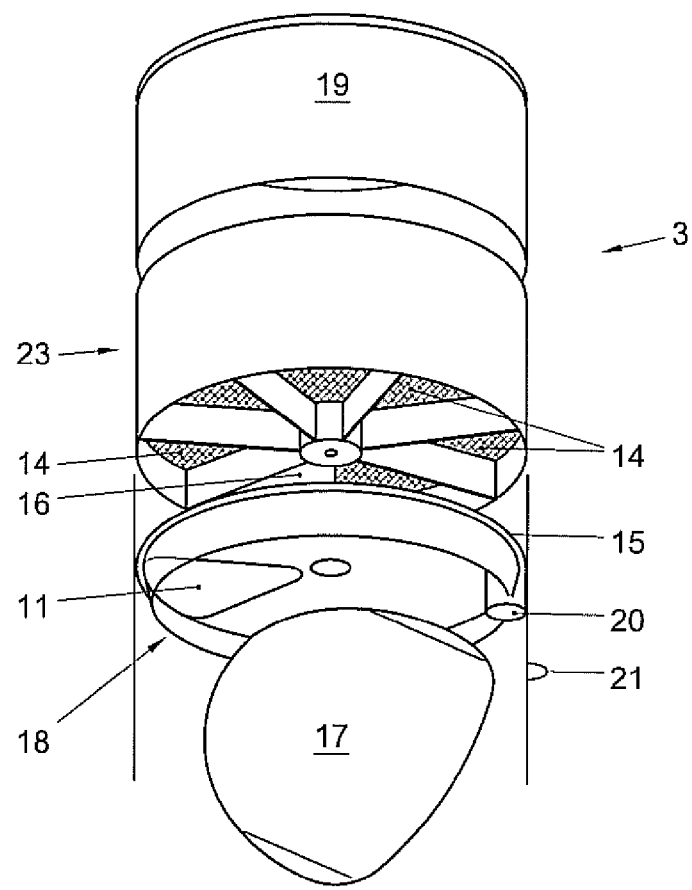
FIG. 2B shows an explosion drawing of a coffee bean package with multiple compartments and dosing device in perspective view.

In FIG. 2A, there is schematically shown a section of a coffee bean package 3 with multiple compartments. In FIG. 2B the coffee bean package 3 with multiple compartments is shown with the package 3 in itself being provided with a dosing device 23. To this end, the package 3, in particular the dosing device 23, is arranged with multiple compartments 14 which are each filled with one dose of coffee beans. The package 3, in particular the dosing device 23, can for instance comprise a displaceable dosing element 15, being a rotary part in the embodiment shown, which displaceable dosing element 15 is provided with a coffee bean outlet 11. In line with the example of FIG. 9, the coffee making apparatus 2 corresponding with the package 3 can for instance be provided with an electric motor which is controlled by the control device 13A for displacing the dosing element 15 by means of for example an element of the coffee making apparatus which acts on the outer wall of the element 15 and which moves along a straight line for rotating the element 15. An example will be provided hereinafter with reference to FIG. 3. Other ways of controlling are also possible. The package according to FIG. 2B may be further provided, under the displaceable dosing element 15, with a flap 206 and a part 204B of a bayonet connection as discussed with reference to FIG. 9. A difference with the variant according to FIG. 9 is that the coffee bean outlet 11 of FIG. 2A and 2B has approximately the same diameter as the compartment 14, whereas in FIG. 9 the diameter of the coffee bean outlet is much smaller than the diameter of the package. In this description, a displaceable dosing element 15 may be understood to cover an element which, through displacement, doses an amount of coffee beans for supply to the grinder 6. By placing the coffee bean outlet 11 under one of the compartments 14, the coffee beans from the respective compartment 14 can move through the coffee bean outlet 11 towards the grinder 6. For instance, the coffee beans fall through the coffee bean outlet 11 by gravity.

For instance, at least one parking position 16 may be provided approximately at the location of which the coffee bean outlet 11 can park, so that no coffee beans flow out undesirably through the coffee bean outlet 11. Furthermore, the package 3 may be provided with a closing strip 17 or the like which closes off an exit side 18 of the coffee bean package 3 before use, and which is to be removed for instance by the user prior to placement of the package 3 in the coffee making apparatus 2. In this way, the exit side 18 of the coffee bean package 3 is hygienically covered before use. Also, a shell 19 may be provided, which encloses the compartments 14, for instance for providing information and/or advertising on the outside of the package 3.

In an embodiment, as discussed above with reference to FIGS. 2 and 9, the coffee making apparatus 2 is arranged to operate the dosing device 23 and/or the closing means 12A. However, other variants are also conceivable. To this end, the coffee making apparatus 2 may be provided with an activation element 19, as shown in FIG. 3. The activation element 19 may further comprise the closing mechanism 12B and the opening means 12C. The dosing and closing functions can be integrated advantageously, as will appear below. For instance, the activation element 19 is embodied as a longitudinal flat element which can be moved along a straight line in two opposite directions 11 and 12 respectively. If the element moves along a straight line in the direction 11 the dosing element 15 rotates in the direction D1. If the element moves along a straight line in the direction 12 the dosing element 15 rotates in the direction D2.

The part provided in the coffee making apparatus 2 is for instance the activation element 19. In this way, the activation element 19 can engage the package 3, in particular the displaceable dosing element 15, for displacing the outlet 11 to the respective compartment 14. The activation element 19 can for instance be controlled electrically and/or mechanically and/or directly by the user.

The activation element 19 may be arranged for operating the displaceable dosing element 15, being a rotary part in the embodiment shown, for placing the coffee bean outlet 11 opposite one of the compartments 14, for supplying the dose of coffee beans to the grinder 6. The displaceable dosing element 15 is for instance rotatable in a rotational direction D1 and D2 for displacing the coffee bean outlet 11 under and/or opposite the desired compartment 14. Thus the element 19 acts as an opening means 12A.

Also, the displaceable dosing element 15 may be arranged as closing means 12A and/or be provided with closing means 12A. When the dosing element 15 is rotated such that it only releases an empty compartment, the other compartments are for instance closed off such that the exposure of the coffee beans in the coffee bean package to ambient air is prevented. Thus the element 19 acts as a closure mechanism 12B.

As shown in FIG. 3 and FIG. 4, the displaceable dosing element 15 may be displaceable in the direction L of the compartments 14. For instance, the displaceable dosing element 15 can be moved relative to the rest of the package 3 so that the coffee bean outlet 11 is released, for instance in a downwardly moved condition, or so that the coffee bean outlet 11 is closed, for instance in an upwardly moved condition (see FIG. 3). As can be seen, the outlet 11 may be arranged on the side of the package 3, in particular the displaceable dosing element 15.

In FIG. 4 an alternative embodiment is shown, where by moving a ring 22, which is part of the closing means 12A, upwards, the coffee bean outlet 11 is released. The package 3 may be provided with multiple compartments 14. Under the closing means 12A a rotatable dosing element 15 may be provided, for instance provided with one outlet 11. The outlet 11 can then, for instance, release one compartment 14 with coffee beans, if the outlet 11 is placed opposite that compartment 14, at least if the closing means 12A release the outlet 11. The closing means 12A, 22 may be arranged for closing off and releasing the coffee bean outlet 11. For instance, the package 3 is arranged such that the coffee bean outlet 11 is released upon connection of the package 3 on the coffee making apparatus 2, in particular onto the connecting device 4. For instance, the closing means 12A, 22 slide upwards if the package 3 is placed in the connecting device 4 of the coffee making apparatus 2. The rotatable dosing element can place the coffee bean outlet 11 opposite the respective compartment 14, for instance with the aid of the activation element 19, and for instance through rotation, so that the coffee beans flow out of the respective compartment 14.

In another embodiment, the package 3 is provided with multiple coffee bean outlets 11, for instance all compartments 14 are provided with an outlet 11, while the coffee making apparatus 2 is provided with one coffee bean inlet 5. For instance, a displaceable dosing element 15 is arranged in the coffee making apparatus 2, where the displaceable dosing element 15 can couple the coffee bean inlet 5 with one of the coffee bean outlets 11 for releasing the coffee beans behind the respective coffee bean outlet 11. The system 1 can for instance be arranged so that the package 3 is rotatable relative to the coffee making apparatus 2, for instance for coupling a particular coffee bean outlet 11 with the coffee bean inlet 5.

In another embodiment, the package 3 can have multiple outlets 11 corresponding to multiple compartments 14, with all outlets 11 comprising closing means 12A. For instance, the activation element 19 is then arranged to open or breakthrough a closure 12 for supplying a dose of coffee beans to the grinder 6. The closing means 12A can for instance comprise a breakable, tearable and/or cuttable foil.

In another embodiment, a dose of coffee beans can be supplied from the respective compartment 14 directly to the coffee making apparatus 2, without the coffee bean package 3 first needing to be connected. The package 3 may then be provided with a dosing device 23. The user himself may then operate the dosing device 23 of the package 3, for instance by releasing the respective outlet 11, and/or for instance by displacing the dosing element 15.

Figure 5B:
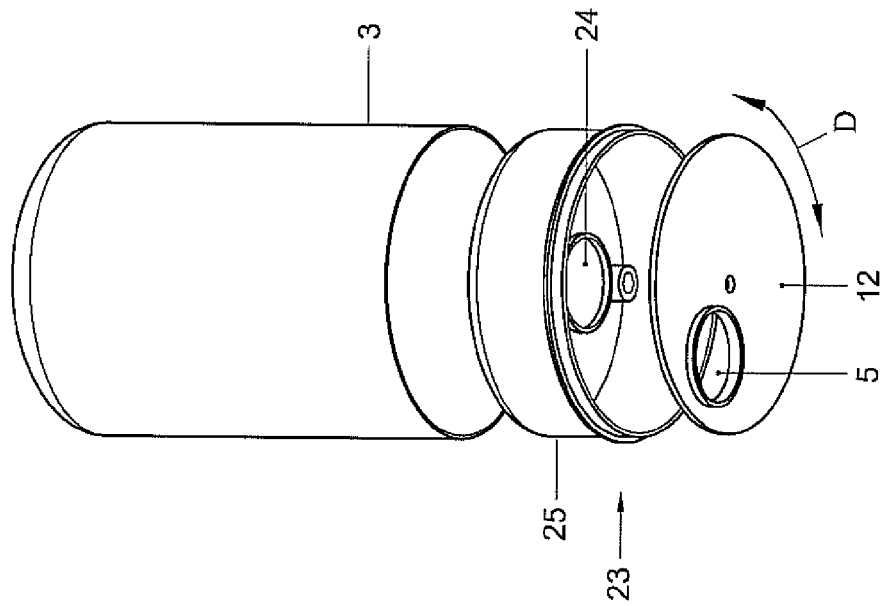
FIG. 5B shows an explosion drawing of a coffee bean package and a dosing device in perspective view.
Figure 5A:
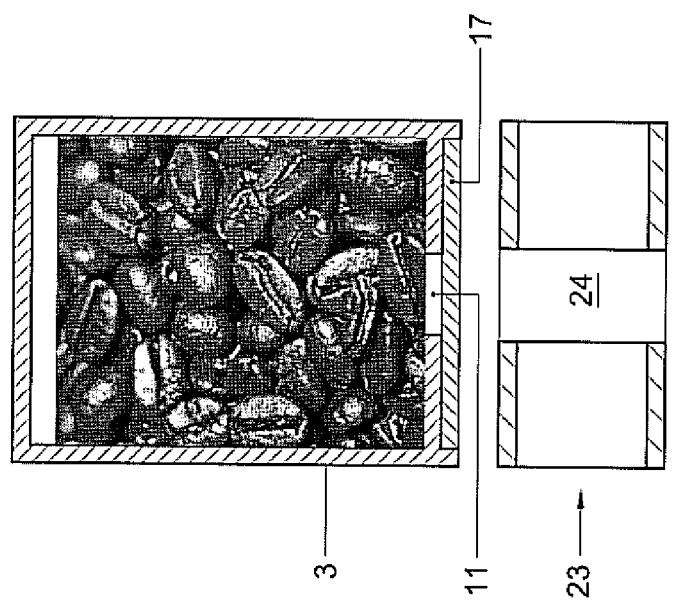
FIG. 5A schematically shows a section of a coffee bean package and a dosing device separately from the package, in side elevation.

In FIG. 5A, 5B another embodiment is shown, where a dosing device 23 may be provided in the coffee making apparatus 2. The dosing device 23 can comprise a rotary and/or sliding mechanism. The dosing device 23 may be provided with a housing 25 with a chamber 24, and a closure 12 with a coffee bean inlet 5. The coffee bean inlet 5 can be moved relative to the chamber 24, so that the chamber 24 is either released or is closed off by the closing means 12A, for instance by rotating the closing means 12A and/or the housing 25 in a rotational direction D.

The package 3 is for instance provided with a coffee bean outlet 11 and a sealing strip 17. By removing the sealing strip 17 at least locally, the coffee bean outlet 11 can be released. For instance, the connecting device 4 is arranged such that upon placement of the package 3, the sealing strip 17 is locally or wholly removed in an automatic manner, or at least so that the coffee bean outlet 11 is released. By placing the chamber 24 under the coffee bean outlet 11, coffee beans can end up in the chamber 24. Preferably, the volume of the chamber 24 is sufficient for temporarily storing one dose of coffee beans. After filling of the chamber 24 with one dose of coffee beans, the chamber 24 and the outlet 11 are displaced relative to each other, so that the outlet 11 is closed off, for instance by the upper surface of the housing 25. By placing the coffee bean inlet 5 under the chamber 24, the dose of coffee beans in the chamber 24 can be released and be passed to the grinder 6. As the outlet 11 and the chamber 24 are not connected to each other anymore, no further coffee beans from the package 3 will be passed via the chamber 24 to the grinder 6, and therefore one dose of ground coffee beans can be supplied to the coffee preparation device.

Figure 6B:
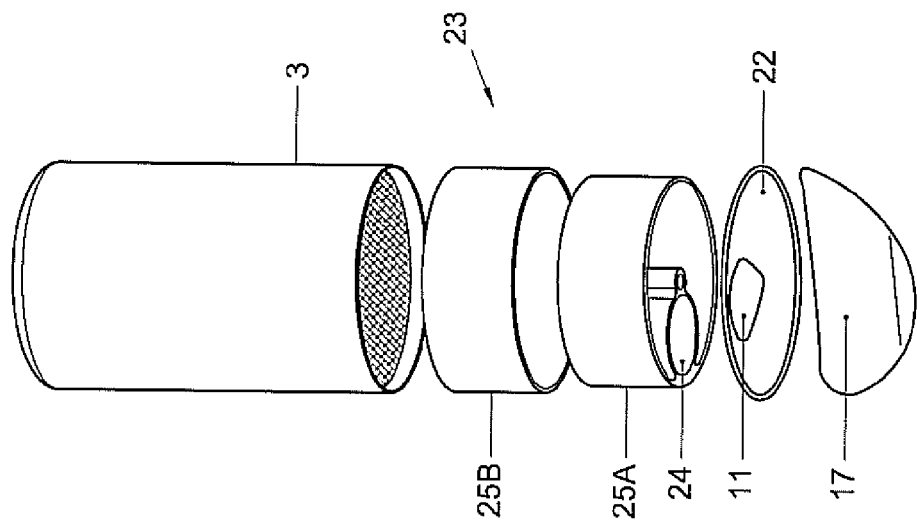
FIG. 6B shows an explosion drawing of a coffee bean package with dosing device in perspective view.
Figure 6A:
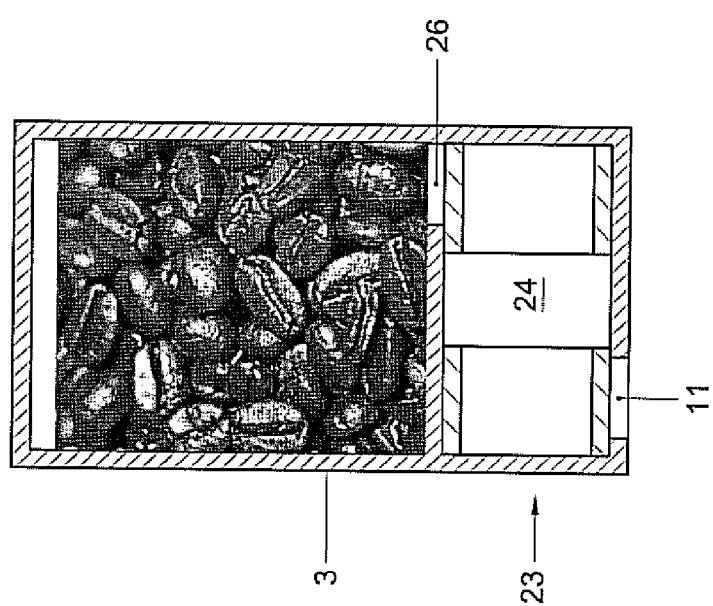
FIG. 6A schematically shows a section of a coffee bean package with dosing device in side elevation.

In FIGS. 6A, 6B an embodiment is shown in which the dosing device 23 is provided in and at the bottom of the package 3. Here, the package 3, in particular the dosing device 23, is for instance provided with a chamber 24 for temporarily storing and/or passing a dose of coffee beans. The chamber 24 may be provided in a first housing part 25A, while the first housing part 25A and the chamber 24 can rotate in and relative to a receiving second housing part 25B, for instance about a central axis 25C of the first housing part 25A. In the explosion drawing of FIG. 6B, the first housing part 25A and the chamber 24 have been rotated, for instance, 90° about the central axis 25C, with respect to the position in FIG. 6A. The housing parts 25A, 25B may be parts of one housing 25. The housing 25 is a part of the dosing device 23. Furthermore, in the package 3, above the housing 25, a space filled with coffee beans is provided. The space comprises for instance only one compartment, and is filled with multiple dosages of coffee beans. Furthermore, a coffee bean passage 26 may be provided at the bottom of the space, under the space with coffee beans, and above the dosing device 23, for supplying the coffee beans to the dosing device 23 under the influence of gravity. The first housing part 25A may be arranged movably, in particular rotatably, relative to the passage 26, while the receiving housing part 25B may be arranged fixedly with respect to the passage 26. The first housing part 25A may be rotated by means of for example an activation element 19 of the coffee making apparatus which acts on the outer wall of the first housing part 25A via an opening in the second housing part 25B and which moves along a straight line in directions 11 and 12 as discussed above for rotating the housing part 25A. Other ways of controlling are also possible. Under the chamber 24, closing means 12A, with a coffee bean outlet 11, may be provided. For instance, the closing means 12A are rotatable with respect to the housing 25. By rotating the first housing part 25A relative to the receiving housing part 25B, the chamber 24 can be placed under the coffee bean passage 26, and a part of the coffee beans, preferably approximately equal to one dose, descends into the chamber 24. The chamber 24 can thereupon be displaced again so that it is not connected to the passage 26, for instance the upper side of the chamber 24 is closed off by a bottom part 26A of the package 3. By thereupon placing the coffee bean outlet 11 under the chamber 24, the dose of coffee beans is supplied to the grinder 6, via the coffee bean inlet 5. For instance, the dosing of the coffee beans is operated through the activation element 19 which is present in the coffee making apparatus 2.

The coffee bean package 3 can for instance comprise right angles and/or be made of substantially rectangular or cylindrical shape. Preferably, the connecting device 4 has a corresponding shape so that the two can be connected to each other. In an embodiment, the inner space of the coffee bean package may be arranged for holding multiple dosages of coffee beans, for instance, when this inner space is wholly filled with coffee beans, at least 20 grams, more particularly at least 50 grams, still more particularly at least 70 grams and still more particularly at least 200 grams of coffee beans. In another embodiment, the package 3 may comprise only one dose of coffee beans, so that the system 1 after each connection of the package 3 processes one dose of coffee beans, for instance for one cup of coffee beverage. Also, a dose can for instance correspond to multiple cups of coffee beverage, or larger cups of coffee beverage, while the user can choose from smaller or larger packages 3, which in use are placed in their entirety in the coffee making apparatus 2. Different packages 3 within the system 1 can involve multiple volumes. Such packages 3 can for instance after one dosage be exchanged and/or thrown away.

Figure 7D:
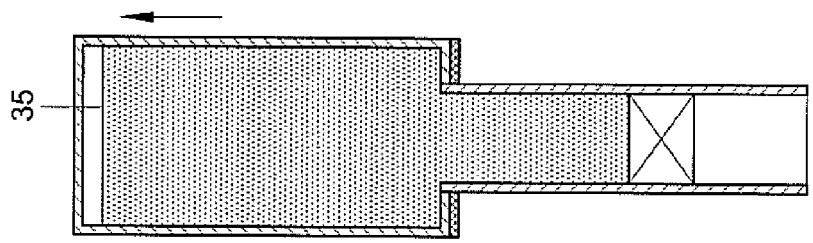
FIGS. 7A-V schematically show steps in a dosing method.
Figure 7C:
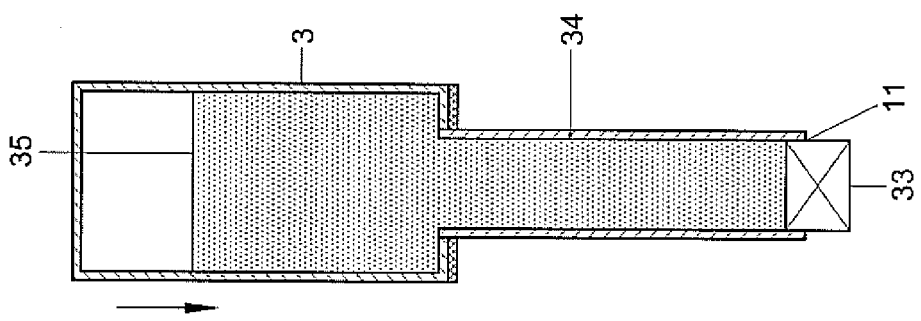
Figure 7B:
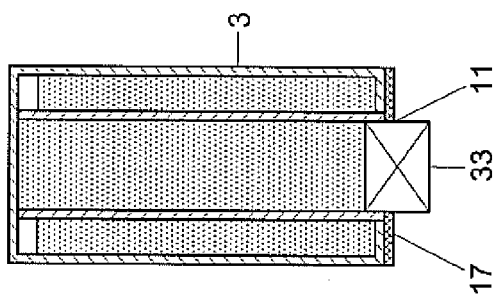
Figure 7A:
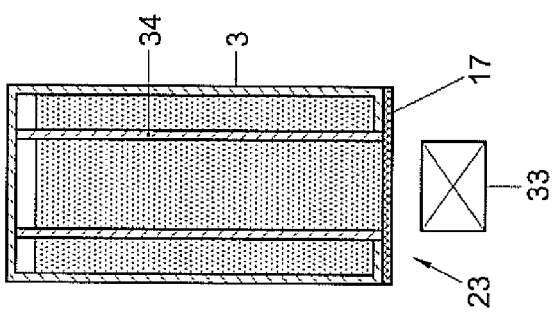
Figure 7H:
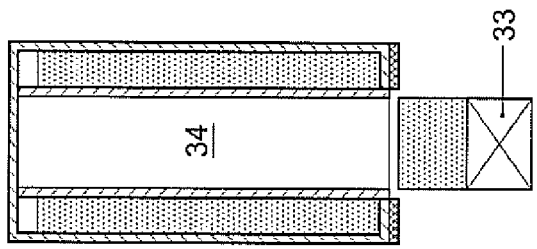
Figure 7G:
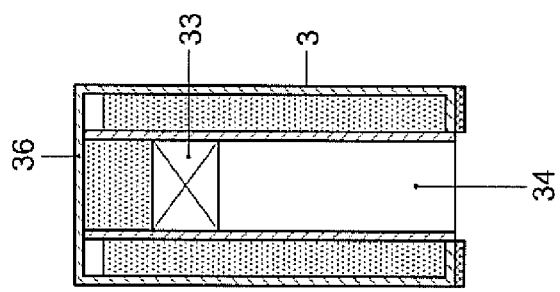
Figure 7F:
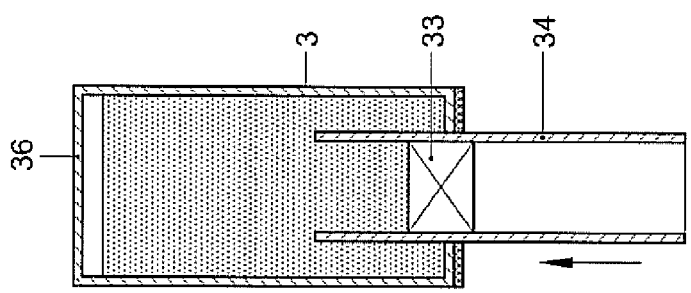
Figure 7E:
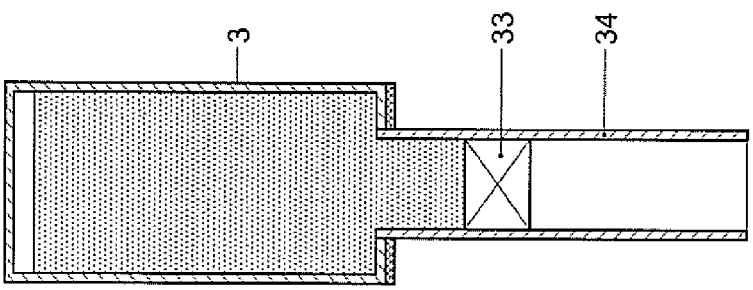
Figure 7L:
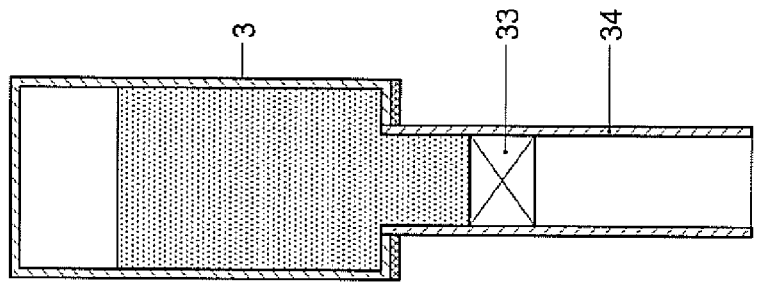
Figure 7K:
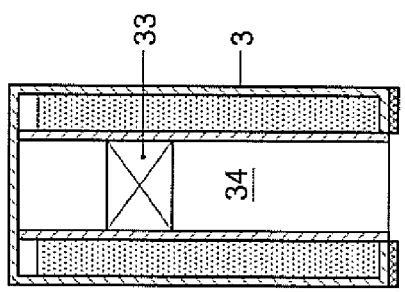
Figure 7J:
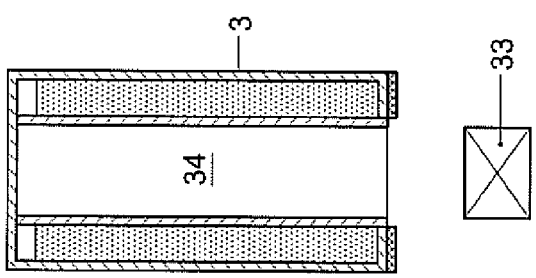
Figure 7I:
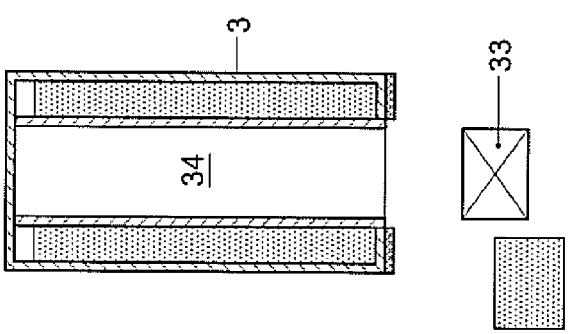
Figure 7P:
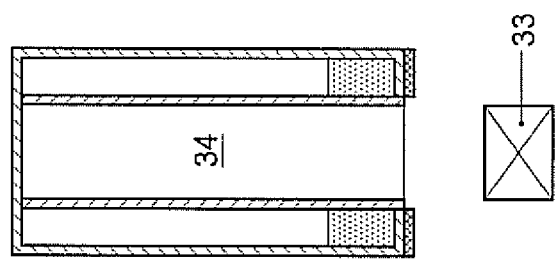
Figure 7O:
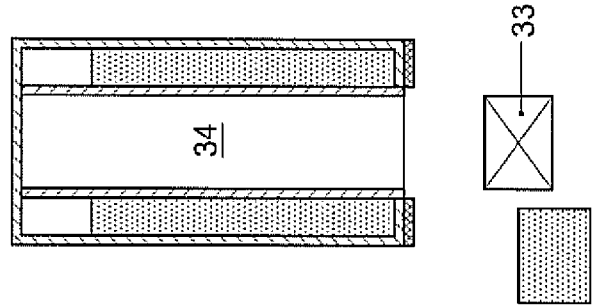
Figure 7N:
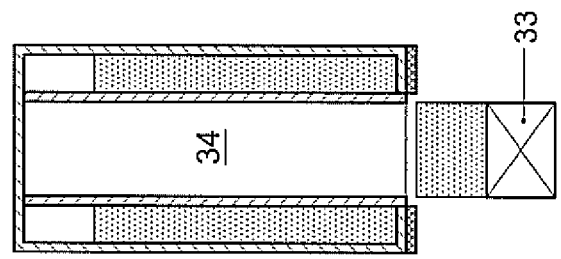
Figure 7M:
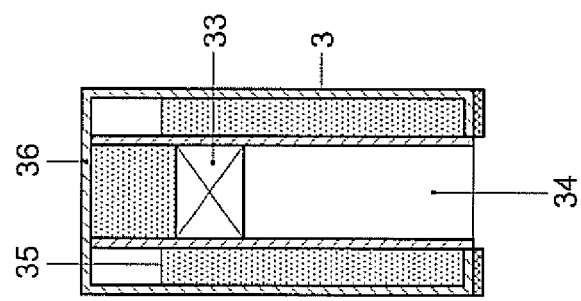
Figure 7T:
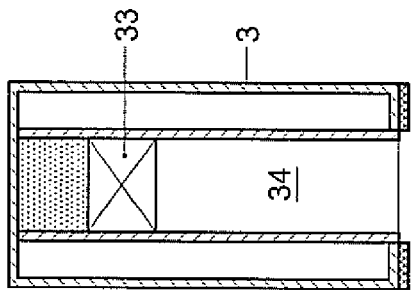
Figure 7S:
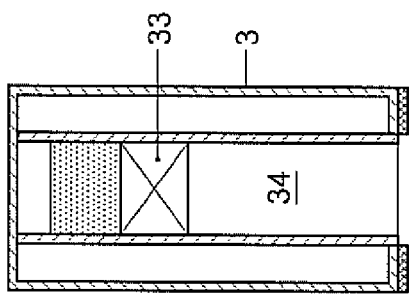
Figure 7R:
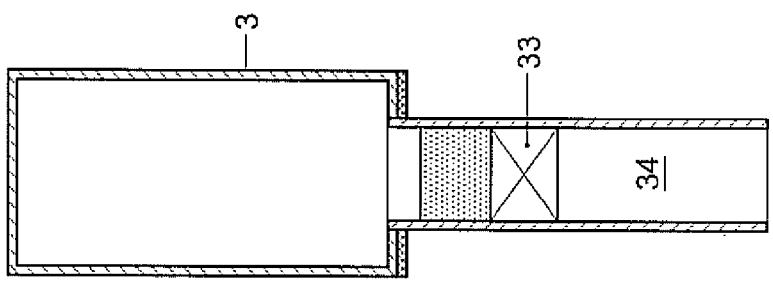
Figure 7Q:
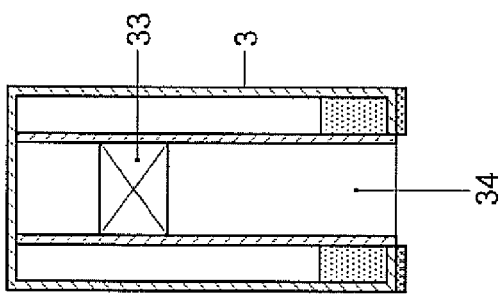
Figure 7V:
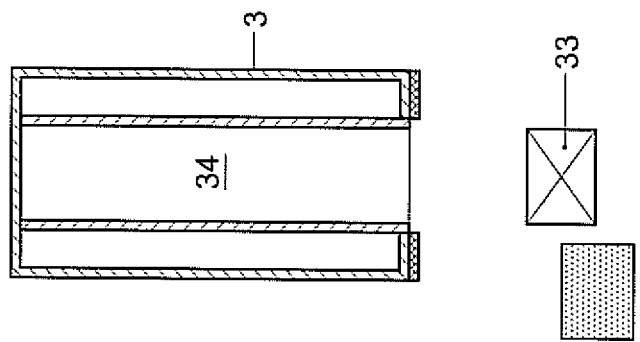
Figure 7U:
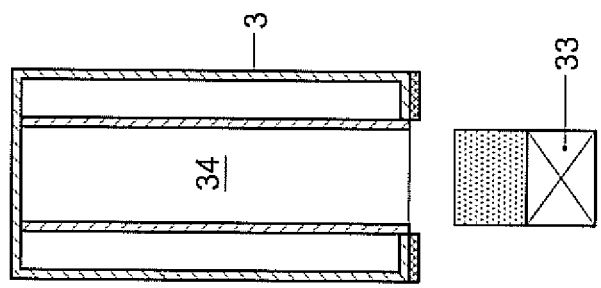

FIGS. 7A-V show in chronological order, by way of example, possible steps for a method with a dosing device 23 for a package 3 with coffee beans. The dosing device 23 is arranged to enable a predetermined dose of coffee beans to be supplied from the package 3 to the coffee making apparatus 2, in particular the grinder 6. The dosing device 23 comprises for instance a piston 33, which may be provided in the coffee making apparatus 2, and a displaceable, in particular slidable, dosing element, in the form of a corresponding tube 34 with coffee bean outlet 11. The tube 34 may be provided in the package 3. The piston 33 and the tube 34 can for instance have a circular cross section or an angular cross section. The tube 34 is preferably filled with at least a part of the coffee beans from the package 3.

In a first step (FIG. 7A) the package 3 is closed. For instance, the package 3 is provided with a sealing strip 17 which preferably closes off the package 3 substantially airtight and/or under vacuum. The package 3 can be connected to a coffee making apparatus 2, which is not further shown. In the package 3 enough coffee beans can be present for multiple dosages of coffee beans for multiple cups of coffee beverage. Preferably, the package 3 is substantially wholly filled with coffee beans.

In a second step, the package 3 is connected onto the coffee making apparatus 2, whereby or whereupon the piston 33 is inserted through the coffee bean outlet 11, for instance through interruption or detachment of at least a part of the sealing strip 17 (FIG. 7B). The piston 33 here closes off the outlet 11, so that no coffee beans get out of the package 3. Preferably, the piston 33 is provided at an end of the tube 34, so that a considerable part of the tuber 34 is still filled with coffee beans. In a next step, the piston 33, the tube 34 and coffee beans in the tube 34 are partly moved out of the package 3 (FIG. 7C), while the piston 33 continues to close off the outlet 11. The upper surface 35 of the coffee beans in the package 3 can thereby come down, so that there is space for the piston 33 to slide further into the package 3, whereby said upper surface 35 will rise (FIG. 7D). The piston 33 continues to rise until the part of the coffee beans that is still in the tube 34 is approximately equal to a predetermined dose of coffee beans (FIG. 7E). The piston 33 will move on to a particular height in the tube 34, which height can determine the dose of coffee beans to be supplied to the grinder 6. The height can for instance depend on settings which have been indicated by the user via the apparatus 2, and/or of a circuit preprogrammed during manufacture of the apparatus 2.

Thereupon the tube 34 and the piston 33 can rise up to a top wall 36, or at least an opposite wall, of the package 3 (FIGS. 7F, 7G), with the tube 34 and the piston 33 remaining in an approximately equal position relative to each other, so that said dose of coffee beans is confined in the tube 34, between the piston 33 and the top wall 36, disallowing any further coffee beans to come to the piston 33. As can be seen, the piston 33 extends between a bottom wall 37 and the top wall 36 of the package 3; for instance the position of the piston 33 is approximately equal to the initial position (FIG. 7A). The piston 33 can now, for instance, descend below the tube 34, while the dose of coffee beans can descend along with it (FIG. 7H). The dose of coffee beans can be released if there is enough free space between the piston 33 and the tube 34 (FIG. 7I). This dose can now be supplied to the grinder 6.

If the dose of coffee beans has been carried off (FIG. 7J), the piston 33 can move back into the tube 34 again, preferably up to the height which determines the dose of coffee beans (FIG. 7K). Thereupon the piston 33 and the tube 34, in equal position relative to each other, can move down whereby the part of the tube 34 above the piston 33 is filled with coffee beans (FIG. 7L). The piston 33 and the tube 34 can thereupon slide towards the opposite wall 36, so that the predetermined dose of coffee beans is confined (FIG. 7M), which predetermined dose in turn can be released by the piston 33 coming down (FIGS. 7N-P). The above steps can be repeated until the package 3 is empty (FIGS. 7Q-V).

In an embodiment not shown, the piston 33 is for instance part of the package 3, while the piston 33 is for instance activated by an activation element 19 in the coffee making apparatus 2, and while the dosing device 23 can function approximately according to the same principle as shown in FIG. 7. In a further embodiment, the dosing device 23, in any case at least the part thereof that is provided in the package 3, may be manufactured substantially from disposable or recyclable materials, such as for instance cellulose, paper, cardboard, or other materials, or for instance from plastic.

In an embodiment, a grinder 6 is provided which is arranged such that the coffee making apparatus 2 comprises no, or at least substantially no, ground coffee anymore after it has stopped grinding. For instance, a dose of coffee beans is supplied to the grinder 6 and ground wholly, after which the grinder 6 stops grinding, with all coffee thereby ground being supplied to the preparation device 7, so that no ground coffee remains behind in the grinder 6 and/or upstream of the grinder 6. Preferably, the system 1 is arranged so that, in use, the grinder 6 does not stop until substantially the whole amount of coffee beans supplied to the grinder 6 have been ground. For instance, the grinder 6 does not stop until all coffee beans and ground coffee have passed through the grinder 6. For instance, the grinding action and/or gravity take care of the passage of the coffee beans and ground coffee.

Figure 8A:
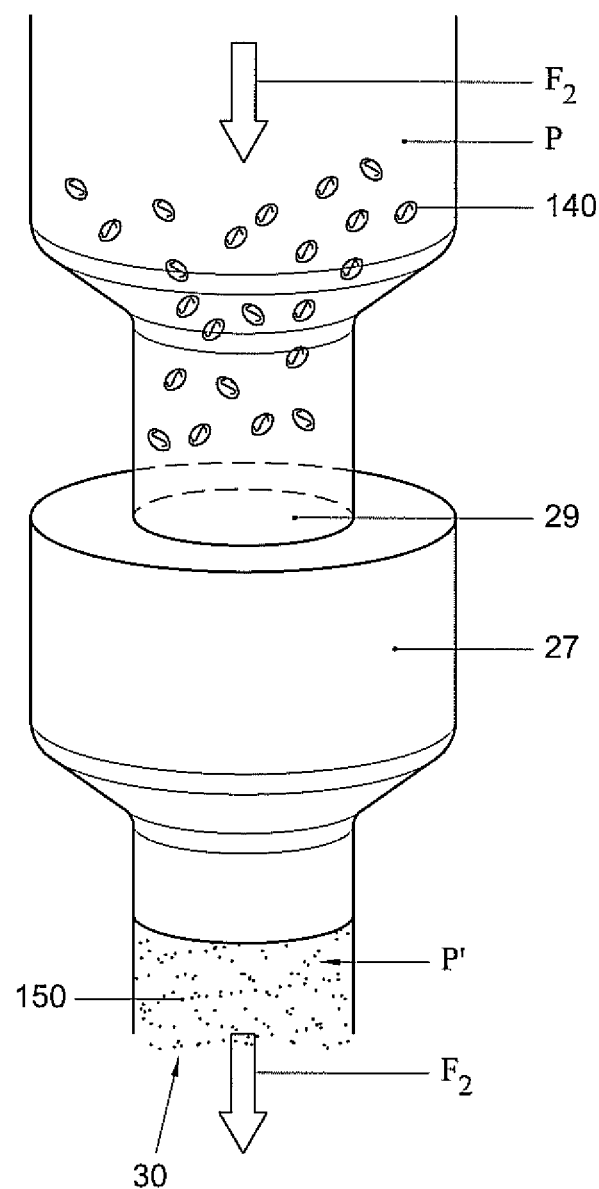
FIG. 8a schematically shows a grinder in front view.
Figure 8B:
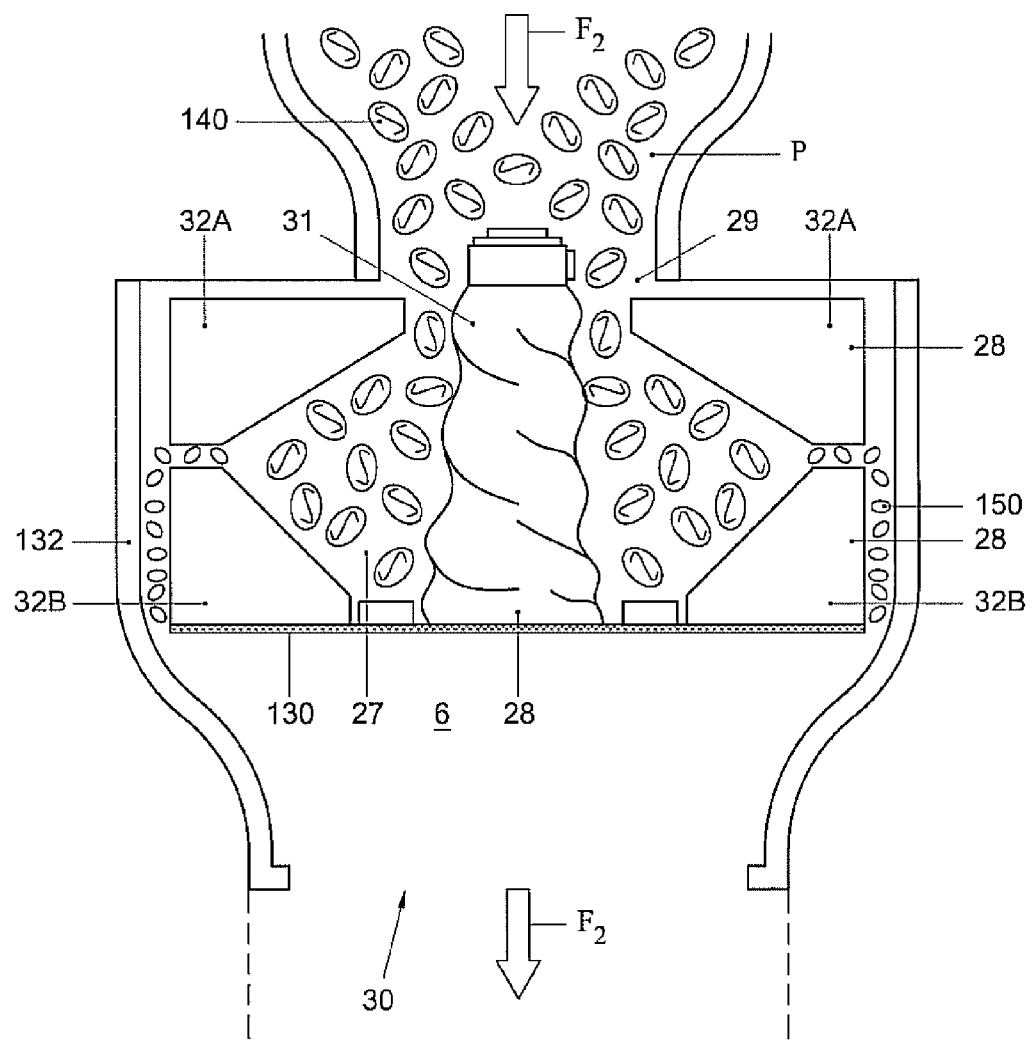
FIG. 8b shows in transparent view the grinder according to FIG. 8a during a beginning of grinding.
Figure 8C:
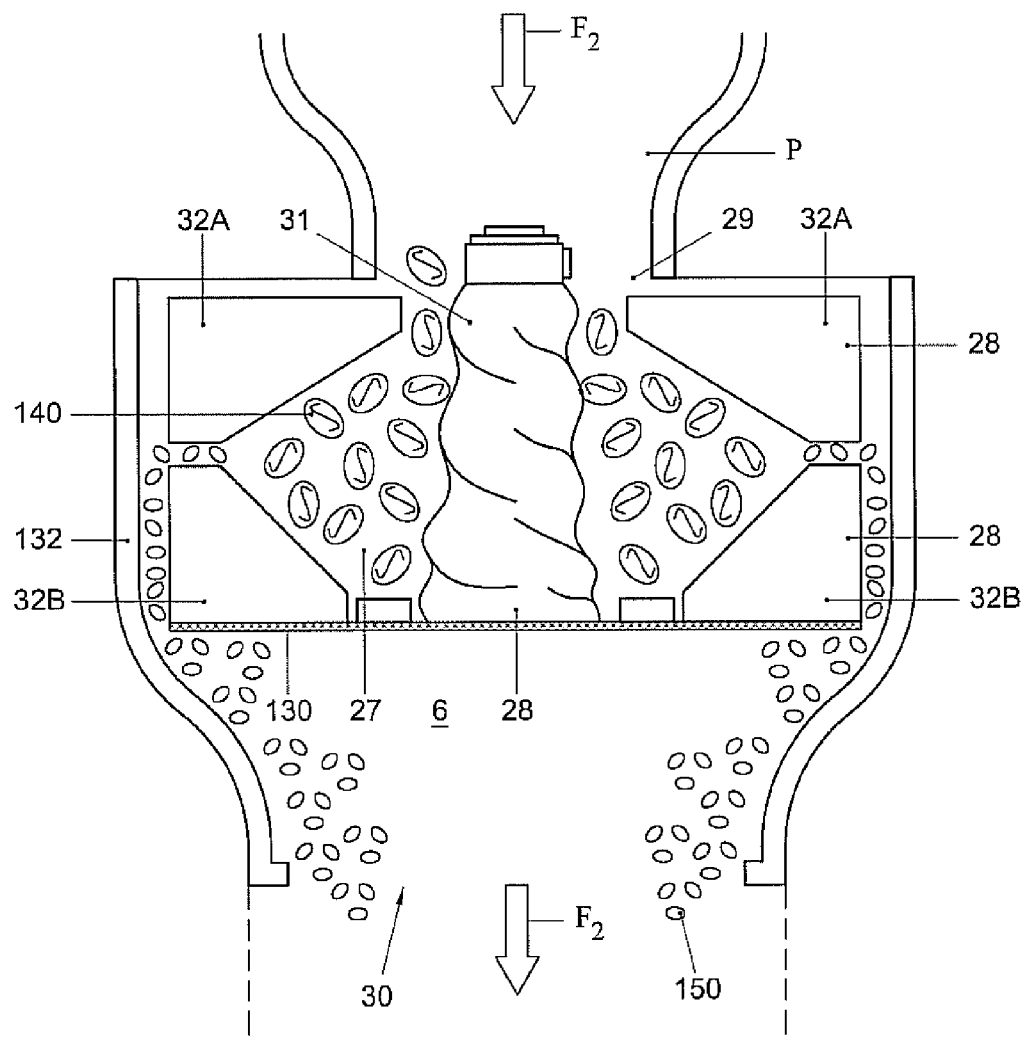
FIG. 8c shows in transparent view the grinder according to FIG. 8a during a later stage of grinding than shown in FIG. 8b.

In a further embodiment, the grinder 6 is provided with a grinding chamber 27, grinding means 28 for grinding coffee beans 140 in the grinding chamber 27, a coffee bean supply opening 29 which is situated at an upper side of the grinding chamber 27 for supplying the coffee beans to the grinding chamber 27 and a ground coffee discharge opening 30 which is situated at a lower side of the grinding chamber 27 (see FIGS. 8a, 8b, 8c). As the discharge opening 30 is situated at the lower side of the grinding chamber 27, the ground coffee 150 can leave the grinding chamber 27 via the lower end through gravity, at least with the grinder 6 in an upstanding condition. Preferably, the grinding means 28 to this end are arranged for passing the coffee beans and/or ground coffee by means of and/or in the direction $F_z$ of gravity, so that all coffee beans and/or ground coffee can be passed substantially from the top down through gravity. Said direction $F_z$ could also be slightly obliquely downwards. The ground coffee discharge opening 30 can for instance be directed obliquely or straight down. The coffee bean supply opening 29 and the ground coffee discharge opening 30 can be spaced apart viewed in vertical direction.

Figure 8D:
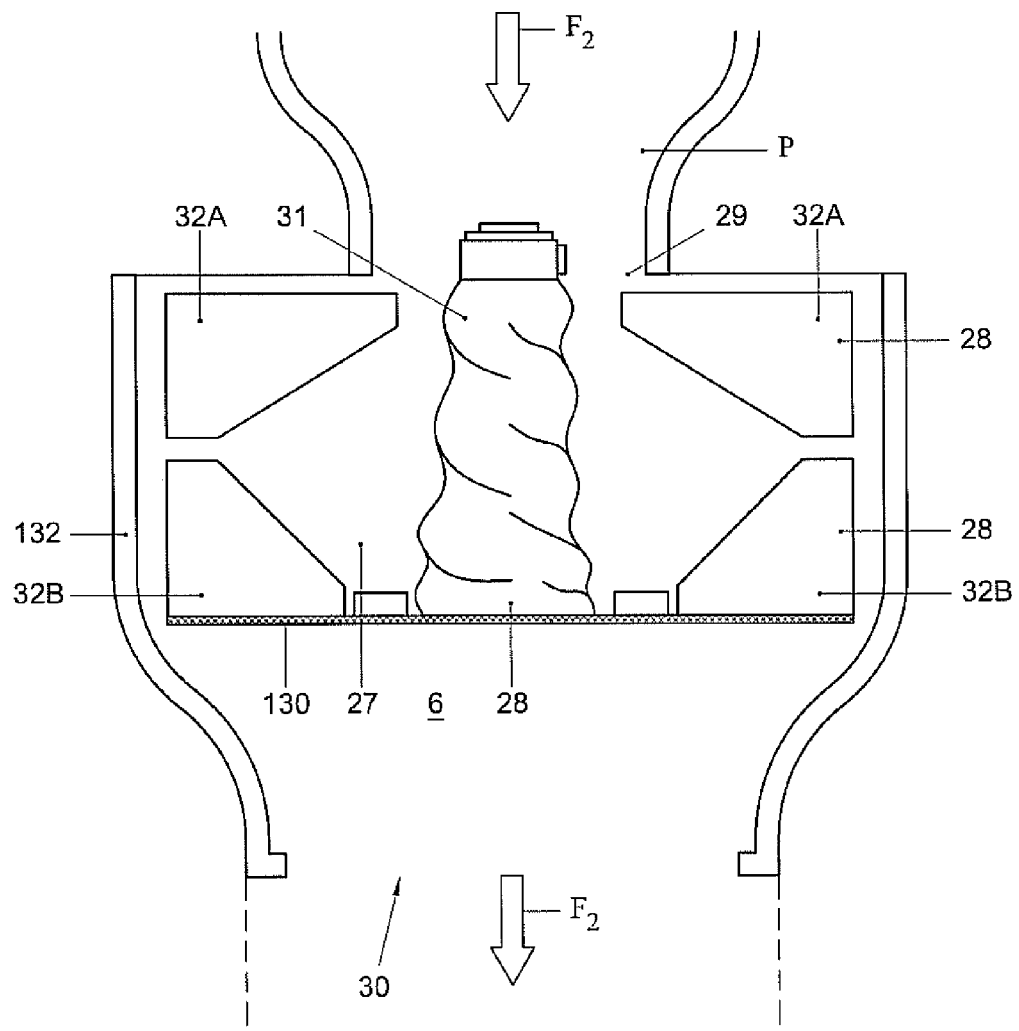
FIG. 8d shows in transparent view the grinder according to FIG. 8a after grinding.

The grinding means 28 may be provided with a coffee bean carrier part 31 for carrying the coffee beans along, for instance in the form of a worm wheel. Furthermore, the grinding means 28 can comprise two grinding elements 32A, 32B, between which the coffee beans are ground. The grinding elements can each be in the form of a ring which is of conical design on the inside. The grinding element 32B and the worm wheel 28 can for instance rotate about the axial axis A (FIG. 8b) and the grinding element 32A can for instance stand still. The worm wheel 28 can be connected with the grinding element 32B for instance through a circular plate with arms 130. The distance between the grinding elements 32A and 32B may be settable in axial direction for setting a grinding coarseness. A drive means for the grinding element 32B may for instance be provided with an electric motor which drives the grinding element 32B through a belt. Also, the grinding element 32B can be part of an electric motor, for instance a rotor of an electric motor. The coffee beans ground by the grinding elements 32A, 32B are for instance fed from the inside and guided to the sides of the grinding elements 32A, 32B (as shown in FIGS. 8b, 8c), or the other way round, fed from the outside to the inside for grinding the coffee beans. As shown in FIG. 8b, the beans are supplied to the grinder through gravity. A part of the beans 140 are already ground, forming ground coffee 150. When the supply of beans is stopped (FIG. 8c), the beans already supplied are still ground. Grinding is continued at least until all beans supplied are ground. Nearly all ground beans then leave the grinder under the influence of gravity (FIG. 8d). The coffee bean carrier part 31 guides the coffee beans to the two grinding elements 32.

In another embodiment, the grinding means 28 comprise for instance knives for grinding the coffee beans. In an embodiment, the bottom side of the inside of the grinding chamber 27 has for instance a conical shape, so that the ground coffee can be guided to the ground coffee discharge opening 30. The parts of the grinder 6 along which the coffee beans and/or ground coffee are guided, preferably with the exception of the grinding surfaces of the grinding elements 32, can have a smooth surface, thereby preventing coffee beans and/or ground coffee from remaining behind. In general, it holds that the grinder may be based on techniques that are known as Conical Burr, Burr Grinding with wheels, roller grinding, Chopping (rotating blades) and pounding.

In an embodiment, for instance cleaning elements may be provided which actively remove any ground coffee left in the grinder 6, preferably towards the coffee preparation device 7. For instance, the grinder 6 may be provided with a blower such as a fan, or sweeping means. Similarly any ground coffee or coffee beans which after having prepared a beverage remain in the coffee bean transport path P and/or the ground coffee transport path P' and/or the coffee preparation device, may be removed by means of for example a blower or sweeping means.

Furthermore, for instance detection elements may be provided which are arranged for detecting residual ground coffee in the grinder 6. These detection elements can make the grinder 6 run until all ground coffee has passed, and then stop it. For instance, the detection elements are arranged for detecting a particular mechanical resistance on the grinding means 28, which resistance will fall away when the coffee beans and ground coffee have passed. The detection elements can for instance also comprise optical sensors or weight sensors. In another embodiment, the grinder 6 can be controlled for a predetermined period of time, during which period of time in most or all cases the dose of coffee beans will have been ground and have traversed the grinder.

The system 1 may be favorably provided with different coffee bean packages 3 in which different kinds of coffee beans are included. Prior to connection, the coffee packages 3 are closed, preferably airtight and/or vacuumized. The system 1 may be thus arranged that after coffee beverage has been prepared with coffee beans from a first coffee bean package 3, the first coffee bean package 3 can be uncoupled from the coffee making apparatus 2 and the second coffee bean package 3 can be coupled to the coffee making apparatus 2, after which coffee beverage can be prepared with the coffee making apparatus 2 with coffee beans from the second coffee bean package 3, substantially without the coffee beans or ground coffee of the first coffee bean package 3 being used for preparing the coffee beverage. As substantially no ground coffee of a previous grinding run will remain behind, the ground coffee of a previous grinding run will not mix with ground coffee of a next grinding run. In particular, this can be achieved by allowing the grinder 6 to continue grinding until all coffee beans supplied have passed the grinder 6. This can for instance be accomplished in a favorable manner with a grinder 6 as described above.

In between grinding runs, the user can therefore exchange coffee bean packages 3 with different kinds of coffee beans without the desired taste of the new coffee beverage being affected. Favorably, the package 3 may be provided with a closure 12 which is reclosable, so that the package 3 can be taken from the coffee making apparatus 2 at any moment, with the package 3 closing off automatically. Preferably no beans can escape from the package if it is in the closed condition. In an embodiment, the package 3 is closed off airtight. For instance, the closure 12 is arranged for airtight closure. The beans remain fresh also if the package is uncoupled from the machine after the package has been used for the preparation of a beverage.

In an embodiment, the closure 12 comprises a flap for closing off the coffee bean outlet 11. For instance the flap links up with the activation element 19 of the coffee making apparatus 2. For instance, the activation element 19 comprises a cam which pushes-in the flap upon placement of the package. The activation element 19 can also comprise an actively controlled, for instance electrically controlled, element which opens the package 3. In another embodiment, the closure 12 comprises for instance a slide or the like, which can also correspond with the activation element 19, while the activation element 19 is arranged to open and/or close the slide for respectively supplying a dose of coffee beans and/or closing off the package 3.

In yet another embodiment, for instance air is extracted from the package 3, whereupon the package 3 is closed off airtight, so that the package 3 can be in a substantially vacuum condition. For instance, the coffee making apparatus 2 is arranged to draw in air and/or coffee beans. For instance, the coffee making apparatus 2 is provided with a pump for carrying off air from coffee bean package 3. For instance, the package 3 comprises flexible walls, for instance allowing the package 3 to shrink upon releasing the coffee beans. The package 3 can for instance be partly flexible and partly stiff. In yet another embodiment, upon closure of the package 3, an inert gas is injected for preserving the coffee beans.

In an embodiment, the coffee making apparatus 2 is provided with an operating panel with at least one operating element. The operating element may be arranged for activating the activation element 19 and/or the grinder 6 so that a dose of ground coffee can be supplied to the preparation device 7 for preparing coffee beverage. In a further embodiment, the at least one operating element is arranged for setting the amount of water and/or the dose of coffee beans.

In an embodiment, the apparatus can for instance also supply, besides hot water, cold water for making a cold coffee beverage, for instance also called ice coffee. The preparation device 7 can be arranged in any suitable manner. The preparation device 7 can for instance comprise a filter or filter holder. The filter can for instance be a metal filter or a paper filter, and may be suitable for reuse or be designed as disposable filter. The preparation device 7 can inter alia comprise a drip coffee maker, a pour-on system, a pressure system, in particular an espresso machine, a percolator and/or a system for making instant coffee. In principle, any coffee preparation method can be used.

In the foregoing, it has been indicated that the closing means 12A can close off the coffee beans in the package, so that the exposure of the coffee beans in the coffee bean package to ambient air is prevented. This is understood to mean, inter alia, a closure which allows at least substantially no air to pass from the environment to the beans in the package and vice versa. Preferably, the closing means can pass at least substantially no air from the environment to the beans in the package and vice versa when there is a pressure difference between the space in the package in which the beans are situated and the environment that is at most 1.1, preferably 1.2, more preferably 1.3 and still more preferably 1.5 bar.

Also, it is possible that larger amounts of coffee beverage are prepared, such as, for instance, a jug of coffee.

Furthermore, it holds preferably that the amount of air which enters the coffee package is at most equal to the volume of the beans supplied from the coffee bean package to the coffee making apparatus. This can be realized, for instance, in that the coffee bean package is connected airtight to the coffee making apparatus and in that the interior of the system where the beans and the ground coffee can be present is designed to be at least substantially airtight with respect to an environment ('the outside world') of the system. For instance in FIG. 1 the coffee bean inlet and the coffee bean outlet are airtight connected with each other. Said interior of the system is formed in FIG. 1 for instance by the inner space of the package, the coffee bean transport path P, the grinder 6, the ground coffee bean transport path P', and the coffee preparation device 7. Air which is then, for instance in the variant according to FIG. 1, present in the coffee bean transport path P will then be displaced by beans supplied from the package to the coffee bean transport path P. This air then flows into the inner space of the package where the beans came from.

In particular, the coffee making apparatus may further be provided with an emptiness detection system. This may for instance be so arranged that the coffee making apparatus with the aid of the sensor 216 can read out an identification code 102 on a bean package and record same in the control device 13A of the coffee making apparatus. The coffee making apparatus then knows on the basis of the identification code what is the amount of beans (for instance in volume or weight) present when it has not been used before. Thereupon the coffee making apparatus can monitor on the basis of the dosage of the coffee beans that is successively supplied from this package to the coffee making apparatus what the residual amount of coffee beans in the package is. This can also be done when the package is uncoupled from the coffee making apparatus and is subsequently connected again. Then the coffee making apparatus will again determine the identification code of the package and hence know what the residual amount of coffee beans in the package is. The coffee making apparatus can update this amount again after coffee beans have been received from the package again. Also, the system may be further provided with means of verifying that upon closure of the package with the closing means 12A the closing means 12A are not blocked by a coffee beans or parts thereof. This can for instance be carried out with the aid of a CCD camera. This camera generates an image of the closing means 12A which image is supplied to the control device 13A. The control device can for instance comprise image signal processing means for recognizing (pattern recognition) a coffee bean or parts thereof and, upon such recognition, generating an alert signal for a user. Also, instead of a coffee bean or a part thereof, it may be simply detected with the camera that the closing means 12A fail to reach the closed condition, for instance through detection of the position of the pin 212 in FIG. 9.

Also, to get the last amount of water somewhat faster through a coffee bed in the coffee preparation device, the system may be arranged to give an extra pulse of air into a filter chamber of the coffee preparation device.

In an embodiment, in the coffee making apparatus 2, also other coffee bean packages 3 may be connected. In yet another embodiment, also coffee beans without any package 3 can be passed directly into the coffee making apparatus 2.

The inner space of the package 3 may be provided with oxygen absorbing means, and/or a shelf life enhancing gas. The package may also be vacuum-packed. To obviate unduly high internal pressure, which may for instance be created upon accumulation of gases from the coffee beans, the package may for instance be provided with a valve which may be arranged to let off gas at a predetermined internal pressure. Preferably, the package 3 is provided with a sealing foil for substantially airtight closing off the outlet 11 and/or the closing means 12A, to prolong shelf life of the beans, at least prior to use. The sealing foil may for instance be provided over the closing means 12A. The foil can optionally be provided with a valve.

In an embodiment, the apparatus 2, and in particular the connecting device 4, is arranged to allow multiple packages 3 to be connected, for instance two or four packages 3. This can allow different tastes of coffee to be selected, or blends with different coffee beans from different packages 3 to be made with the apparatus 2. The apparatus 2 may be provided with multiple connecting devices 4, and multiple coffee bean inlets 5, which can guide ground coffee beans to a common grinder 6. For instance, one coffee preparation device 7 is provided. In another embodiment, multiple grinders 6 are provided which can grind the coffee beans of the respective packages 3. Also, multiple coffee preparation devices 7 may be provided. In an embodiment, the system 1 concerns a kit of different parts to enable assembling of the parts to form the system 1. In a further embodiment, the package 3 concerns a kit. For instance, particular parts of the package 3 and the coffee beans can be supplied as loose parts, allowing the package 3 to be assembled and filled with coffee beans by a user. Loose parts, such as for instance shown in FIGS. 2B, 5B and 6B, can be assembled at home by the user. The parts can for instance be provided with snap fingers, or snap edges or the like, so that the parts can be snapped into each other. The package 3 which is assembled from the kit can be connected to the apparatus 2. For instance, the loose parts concern inter alia the dosing device 23 (if present), loose compartments 14, activation elements 19 such as cams, rings, discs, and the like. For instance, the kit includes loose parts such as loose wall parts, bottom parts, coffee beans packed in a loose package which are to be fed into the package 3 to be connected, etc. Similarly the coffee making apparatus can be provided in a kit.

In the above description, reference is made to a package 3 with an inner space. In an embodiment, the package 3 comprises a cover, or the upper wall or top of the package 3 comprises a foil or opening or the like, for opening and allowing replenishment of the package 3.

The variations described and many comparable ones, as well as combinations thereof, are understood to fall within the scope of the invention outlined by the claims. Of course, different aspects of different embodiments and/or combinations thereof can be combined with each other and interchanged. Thus, there should be no limitation to just the embodiments mentioned.

The invention claimed is:

1. A system for preparing a coffee beverage, the system comprising:
   a coffee making apparatus comprising a grinder for grinding coffee beans to obtain ground coffee, a coffee preparation device configured to prepare the coffee beverage, and a coffee outlet for dispensing the coffee beverage,
   a separate coffee bean package with an inner space which at least prior to use is filled with coffee beans, a connecting device for connecting the coffee bean package to the coffee making apparatus, and opening means for opening the coffee bean package, wherein the coffee making apparatus is provided with a coffee bean inlet for supply of coffee beans from the coffee bean package to the grinder when the coffee bean package is connected to the coffee making apparatus,
   a dosing device for supplying coffee beans from the package to the grinder in predetermined dosages;
   wherein the coffee making apparatus is provided with a coffee bean transport path which extends from the coffee bean inlet of the coffee making apparatus to the grinder of the coffee making apparatus and a ground coffee transport path which extends from the grinder to the coffee preparation device;
   wherein the coffee making apparatus is so arranged that after preparing the coffee beverage substantially no unused ground coffee or coffee beans remain behind in the grinder and in the coffee bean transport path and wherein the system is so arranged that, in use, the grinder does not stop grinding until after the complete dose of coffee beans has been passed through the grinder;
   wherein the system is so arranged that, in use, the coffee beans are transported from the coffee bean package to the grinder under the influence of gravity and wherein the system is so arranged that, in use, the ground coffee is transported from the grinder to the coffee preparation device under the influence of gravity.

2. A system according to claim 1, wherein the coffee bean package is provided with closing means which can take up an open and closed condition, wherein in the open condition coffee beans can be supplied from the coffee bean package to the coffee making apparatus and wherein in the closed condition the closing means close off the coffee bean package in itself, such that when it is uncoupled from the coffee making apparatus, the exposure of the coffee beans in the coffee bean package to ambient air is acted against and/or prevented and/or such that is prevented that coffee beans can leave the coffee bean package and/or such that substantially no coffee beans can leave the coffee bean package.

3. A system according to claim 1 wherein the coffee making apparatus comprises at least a part of the opening means or wherein the coffee making apparatus is provided with the opening means.

4. A system according to claim 1, wherein the opening means are arranged for opening the coffee bean package if the coffee bean package is connected to the coffee making machine.

5. A system according to claim 4 wherein the opening means are arranged for opening the coffee bean package after that the coffee bean package is connected to the coffee making apparatus or wherein the opening means are arranged for opening the coffee bean package when the coffee making apparatus is activated to prepare a beverage wherein optionally the opening means are arranged to close the coffee bean package after that beans are transported from the coffee bean package to the coffee making apparatus for preparing the beverage.

6. A system according to claim 2 wherein the opening means are arranged for opening the coffee bean package if the coffee bean package is connected to the coffee making machine and wherein the opening means control the closing means for opening and/or closing the coffee bean package.

7. A system according to claim 1, wherein the coffee making apparatus is provided with the connecting device for connecting the coffee bean package to the coffee making apparatus and the opening means for opening and optionally closing the coffee bean package.

8. A system according to claim 1, wherein the coffee making apparatus is provided with the coffee bean inlet for supply of coffee beans from the coffee bean package to the grinder when the coffee bean package is connected and opened to the coffee making apparatus.

9. A system according to claim 2 wherein the system is provided with a closing mechanism which is arranged to bring the closing means of the coffee bean package preferably automatically into closed condition when the coffee bean package is being uncoupled from the coffee making apparatus.

10. A system according to claim 2, wherein the system is provided with a closing mechanism to close the coffee bean package while it is still connected to the coffee making apparatus and is not used for delivering coffee beans to the coffee making apparatus.

11. A system according to claim 1 wherein the coffee bean package is provided with closing means which can take up an open and closed condition, wherein in the open condition coffee beans can be supplied from the coffee bean package to the coffee making apparatus and wherein in the closed condition the closing means close off the coffee bean package in itself, such that no coffee beans escape from the coffee bean package.

12. A system according to claim 1 wherein the system is provided with the connecting device for connecting to each other and uncoupling from each other again the coffee bean package and the coffee making apparatus, wherein in connected condition coffee beans can be supplied from the coffee bean package via the coffee bean inlet to the grinder for preparing the coffee beverage.

13. A system according to claim 1, wherein the system is so arranged that the coffee beans are delivered to the grinder when the coffee making apparatus is activated for preparing the coffee beverage.

14. A system according to claim 1, wherein the coffee bean package is provided with a coffee bean outlet which is connected with the coffee bean inlet for supplying coffee beans from the inner space of the coffee bean package to the grinder.

15. A system according to claim 14, wherein the coffee bean inlet is detachably connected with the coffee bean outlet for uncoupling/separating the coffee bean package from the coffee making apparatus.

16. A system according to claim 14, wherein the coffee bean package is provided with a closure for closing off the coffee bean outlet in an uncoupled condition of the coffee bean outlet.

17. A system according to claim 14, wherein the coffee bean package is so arranged that the inner space in which the coffee beans are stored is closed off, so that no coffee beans fall out of the package when the coffee bean outlet is closed off with the closure.

18. A system according to claim 14, further comprising a closing mechanism which automatically closes off the coffee bean outlet with the closure when the coffee bean outlet is uncoupled from the coffee bean inlet and/or after supply of coffee beans to the grinder.

19. A system according to claim 14, wherein the coffee bean outlet can be uncoupled from the coffee bean inlet by hand for separating the coffee bean package and the coffee making apparatus from each other.

20. A system according to claim 1, wherein the dosing device is included in the coffee bean package.

21. A system according to claim 1, wherein the dosing device is included in the coffee making apparatus.

22. A system according to claim 1, wherein the dosing device comprises a displaceable dosing element.

23. A system according to claim 1, wherein the weight of the dose of coffee beans is approximately equal to 50 grams or less.

24. A system according to claim 1, wherein the grinder is so arranged that the grinder comprises at least substantially no ground coffee anymore after grinding has been stopped.

25. A system according to claim 1, wherein the coffee making apparatus is so arranged that the grinder and the coffee preparation device comprise at least substantially no ground coffee anymore after a beverage has been prepared.

26. A system according to claim 1, wherein the coffee making apparatus is configured such that after preparing the coffee beverage substantially no unused ground coffee or coffee beans remain behind in the ground coffee transport path and/or the coffee preparation device.

27. A system according to claim 1, wherein the coffee making apparatus is so arranged that prior to preparing the coffee beverage substantially any unused ground coffee or coffee beans remaining behind in the grinder and in the coffee bean transport path are removed and optionally any unused ground coffee or coffee beans remaining behind in the ground coffee transport path and/or the coffee preparation device are removed.

28. A system according to claim 1, wherein the grinder is provided with a grinding chamber, grinding means for grinding coffee beans in the grinding chamber, a coffee bean supply opening which is situated at an upper side of the grinding chamber for supplying the coffee beans to the grinding chamber, and a ground coffee discharge opening which is situated at a lower side of the grinding chamber.

29. A system according to claim 28, wherein the grinding means are arranged for passing-through the coffee beans and/or the ground coffee by means of gravity.

30. A system according to claim 1 wherein the inner space of the coffee bean package, when it has not been used before, comprises at least 20 grams.

31. A system according to claim 1, wherein the coffee bean package is a disposable holder which is arranged to be thrown away after use and/or when empty.

32. A system according to claim 1, further comprising a first coffee bean package in which a first kind of coffee beans is included and a second coffee bean package in which a second kind of coffee beans is included which is different in kind with respect to the first kind, wherein after coffee beverage has been prepared with the coffee making apparatus with coffee beans from the first coffee beans package, the first coffee bean package can be uncoupled from the coffee making apparatus and the second coffee bean package can be coupled to the coffee making apparatus after which coffee beverage can be prepared with the coffee making apparatus with coffee beans from the second coffee bean package substantially without coffee beans or ground coffee from the first coffee bean package being used for preparing the coffee beverage.

33. A system according to claim 2, wherein the coffee making apparatus is provided with a check device for checking that upon closure of the coffee bean package no closing means of the coffee bean package are being blocked, for instance by a coffee bean or a part thereof.

34. A system according to claim 1, wherein the coffee bean package is at least substantially constructed from tin and/or as a tin.

35. A system according to claim 1, wherein the coffee making apparatus is arranged to prepare the coffee beverage under high pressure which is conventional for preparing espresso coffee, under atmospheric pressure which is conventional in pour-on drip extraction systems, or under slightly elevated pressure in the order of 1.1-2 bar.

36. A system according to claim 1, further comprising means to detect that a package comprises no coffee beans anymore, at least not sufficient coffee beans for preparing a consumption of coffee beverage, such as a cup of coffee beverage.

37. A system according to claim 36, wherein the means to detect that a package comprises, at least not sufficient coffee beans for preparing a consumption of coffee beverage, is an emptiness detection means.

38. A system according to claim 1, wherein to get the last amount of water somewhat faster through a coffee bed in the coffee preparation device, the system provides an extra pulse of air into a filter chamber of the coffee preparation device.

39. A system according to claim 1, wherein the weight of the dose of coffee beans is approximately equal to 20 grams or less.

40. A system according to claim 1, wherein the weight of the dose of coffee beans is approximately equal to 15 grams or less.

41. A system according to claim 1, wherein the inner space of the coffee bean package, when it has not been used before, comprises at least 50 grams of coffee beans.

42. A system according to claim 1, wherein the inner space of the coffee bean package, when it has not been used before, comprises at least 70 grams of coffee beans.

43. A system according to claim 1, wherein the inner space of the coffee bean package, when it has not been used before, comprises at least 200 grams of coffee beans.

44. A system according to claim 1, wherein the inner space of the coffee bean package, when it has not been used before, comprises approximately 5-10 grams of coffee beans.

45. A system according to claim 1, wherein the inner space of the coffee bean package, when it has not been used before, comprises approximately 6-8 grams of coffee beans.

46. A system according to claim 1, wherein the coffee making apparatus is arranged to prepare the coffee beverage under high pressure which is conventional for preparing espresso coffee, under atmospheric pressure which is conventional in pour-on drip extraction systems, or under slightly elevated pressure in the order of 1.1-1.5 bar.

* * * * *